(12) United States Patent
Toyoda et al.

(10) Patent No.: US 6,448,952 B1
(45) Date of Patent: Sep. 10, 2002

(54) STEREOSCOPIC IMAGE DISPLAY DEVICE

(75) Inventors: Akito Toyoda, Nishikamo-gun; Kenji Yamamoto, Takahama; Masaaki Ozaki, Kariya; Naoki Matsumoto, Aichi-gun, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/490,106

(22) Filed: Jan. 24, 2000

(30) Foreign Application Priority Data

Jan. 26, 1999 (JP) ............................................ 11-017448
Mar. 18, 1999 (JP) ............................................ 11-073981
May 24, 1999 (JP) ............................................ 11-143764

(51) Int. Cl.$^7$ .............................................. H04N 15/00
(52) U.S. Cl. ........................................... 345/97; 348/43
(58) Field of Search ............................. 345/6, 7, 8, 9, 345/103, 82, 89, 98, 100; 348/51, 56, 53

(56) References Cited

U.S. PATENT DOCUMENTS

| | | | | |
|---|---|---|---|---|
| 5,416,510 A | * | 5/1995 | Lipton et al. | 348/43 |
| 5,748,382 A | * | 5/1998 | Maguire, Jr. | 359/666 |
| 6,046,787 A | * | 4/2000 | Nishiguchi | 349/119 |
| 6,215,532 B1 | * | 4/2001 | Takagi et al. | 345/7 |

FOREIGN PATENT DOCUMENTS

| JP | Hei 3-125187 | * 1/1991 |
|---|---|---|
| JP | 5-119746 | 5/1993 |
| JP | 9-51552 | 2/1997 |

* cited by examiner

Primary Examiner—Vijay Shankar
Assistant Examiner—Nitin Patel
(74) Attorney, Agent, or Firm—Law Offices of David G. Posz

(57) ABSTRACT

A device for displaying a stereoscopic image in which cross-talk is suppressed. A left eye image and a right eye image alternately displayed on a liquid crystal display panel are viewed through an eye shutter having a left eye and a right eye shutter which are alternately switched. The image is displayed on the panel by sequentially supplying scanning voltages on a scanning electrode array and supplying image data voltages on a data electrode array in synchronism with the scanning voltages. The display panel is divided into an upper part and a lower part which are scanned separately in opposite directions. The left eye image is displayed in the first field during which all scanning electrodes in both parts are scanned, and the right eye image is similarly displayed in the second field following the first field. A certain time interval is provided between the first and second fields, while properly setting the eye shutter switching timing. Thus, cross-talk images are displayed only in limited regions close to upper and lower edges of the display panel. The display panel may be scanned in a single scanning method, and the displayed image may be held with a lower brightness to suppress the cross-talk images.

22 Claims, 30 Drawing Sheets

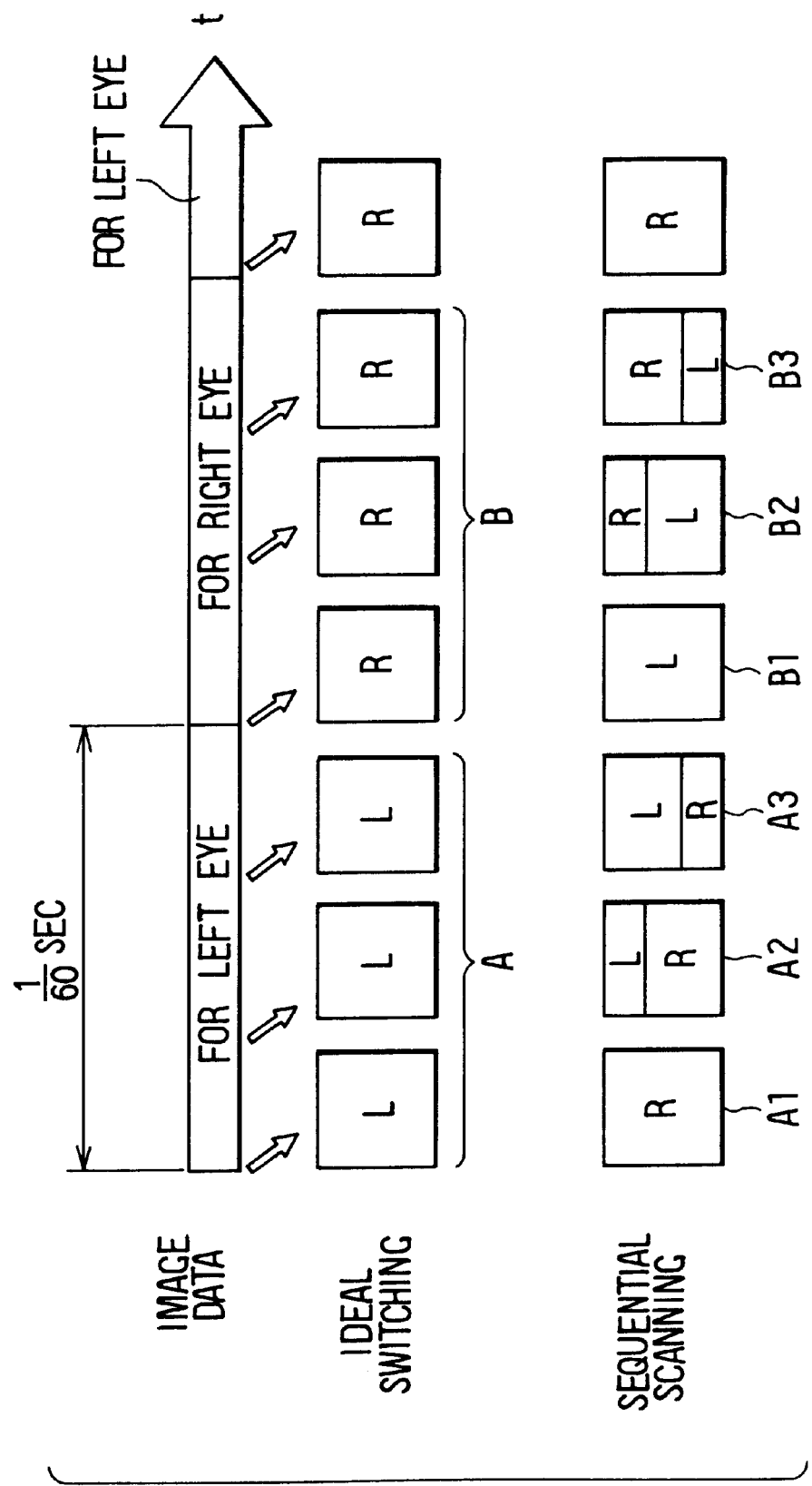

STEREOSCOPIC IMAGE DISPLAY DEVICE

CROSS-REFERENCE TO RELATED APPLICATIONS

This application is based upon and claims benefit of priority of Japanese Patent Applications No. Hei-11-17448 filed on Jan. 26, 1999, No. Hei-11-73981 filed on Mar. 18, 1999, and No. Hei-11-143764 filed on May 24, 1999, the contents of which are incorporated herein by reference.

BACKGROUND OF THE INVENTION

1. Field of the Invention

The present invention relates to a stereoscopic, or three dimensional, display device using a display panel such as a liquid crystal display panel.

2. Description of Related Art

A stereoscopic display device in which images having respective parallax for left and right eyes are displayed on a panel and shown to a viewer through a parallax barrier or a lenticular plate is known hitherto. In this device, however, image resolution is low because the images are shown through the parallax barrier or the lenticular plate. In addition, image brightness is decreased in the case the parallax barrier is used, while an image focus is blurred due to lens abberation in the case the lenticular plate is used.

To cope with these problems, another type of stereoscopic image display device that displays alternately respective images for left and right eyes has been proposed and used. An example of this type of display device, viewed from its top, is shown in FIG. 37. A direction-time-shared light source 1 is constituted by a convex lens 2 and a light source 3 that emits light from regions 3L and 3R alternately. An image for a left eye is projected by the light from the region 3L and an image for a right eye is projected by the light from the region 3R through a liquid crystal panel 4. Both images are alternately switched from one to the other by switching the light emitting regions 3L and 3R. Thus, stereoscopic images are shown to a viewer. However, the images displayed on the liquid crystal panel 4 have to be switched from an image for the left eye to another image for the right eye, or vice versa, in synchronism with switching of the time-shared light source. Because the images are displayed by sequentially scanning the panel, both images for the left and right eyes are simultaneously shown when the images are switched. This phenomenon is called "cross-talk."

FIG. 38 is a drawing to explain the cross-talk phenomenon. To show stereoscopic images to a viewer, it is necessary to display respective images including parallax for the left and right eyes. It is ideal if the left eye image "A" is completely switched to the right eye image "B" with a switching frequency of, e.g., 60 Hz, as shown in the middle part of FIG. 38. In actual operation, however, the images displayed by sequential scanning in the vertical direction cannot be switched instantaneously. As shown in the bottom part of FIG. 38, at the beginning of left eye image display, an image "A1" for the right eye still remains displayed on the panel. As image data input for the left eye proceeds, the image is gradually rewritten to the image for the left eye, as shown by "A2" and "A3." When the input for the left eye image is completed, the display is completely rewritten to the left eye image as shown by "B1." At this moment, image data input for the right eye starts, and then, the right eye image is gradually written as shown by "B2" and "B3." Since both images for the left and right eyes are displayed with a frequency of 30 Hz in the example shown in FIG. 38, the image for each eye being switched with a frequency of 60 Hz. As understood from the above, the left eye image mixed with the right eye image is actually shown to the left eye, and similarly, the right eye image mixed with the left eye image is shown to the right eye. This phenomenon is called cross-talk.

To cope with the cross-talk problem, JP-A-9-51552 proposes a display device which shows a black image at a time of switching images from one eye to the other eye. However, showing the black image between the images for both eyes causes another problem. That is "flicker" which is detrimental to display quality. It would be necessary to increase the display frequency to 240 Hz or higher to eliminate flicker. If the display frequency is 240 Hz, a period of time for writing one frame is 4.17 ms. Assuming the number of scanning electrodes is 480, a period of time available for writing one line is only 8.7 microseconds. The number of scanning electrodes has to be larger than 480 to display a high resolution image, making the writing period further shorter. This means that the liquid crystal used in the panel must have such characteristics that one line can be written within 8.7 microseconds or less, and the response time is 4.17 ms or less. However, a liquid crystal having such a high performance is unknown at present.

SUMMARY OF THE INVENTION

The present invention has been made in view of the above-mentioned problems, and an object of the present invention is to provide an improved stereoscopic image display device in which cross-talk is suppressed without causing flicker.

A stereoscopic image display device is composed of a flat display panel, driver circuits for driving the display panel and an eye shutter to be worn by a viewer. An left eye image and a right eye image are alternately shown on the display panel, and the eye shutter is alternately switched from the left eye to the right eye, or vice versa, in response to display of the respective left and right eye images. Thereby, the displayed image is recognized as a stereoscopic image by a viewer wearing the eye shutter.

The display panel includes a number of scanning electrodes to which scanning voltages are supplied, a number of data electrodes, running perpendicularly to the scanning electrodes, to which image data are supplied, and liquid crystal such as antiferroelectric liquid crystal filling an enclosed space between the scanning and data electrodes. Pixels are formed at each intersection of both electrodes together with the liquid crystal, thereby forming a pixel matrix for displaying picture images thereon. The driver circuits supply driving voltages consisting of the scanning voltages and data voltages to the display panel in a controlled manner. The eye shutter having a left eye shutter and a right eye shutter is worn by a viewer.

The display panel is divided into a lower part and an upper part, both parts are separately and simultaneously scanned in opposite directions to write images on the pixels on the respective scanning electrodes. This scanning is called dual scanning. For example, the lower part is scanned from the center of the panel toward the lower edge of the panel, while the upper part is scanned from the center of the panel toward the upper edge of the panel in synchronism with the scanning of the lower panel. The left eye image is displayed in the first field in which all the scanning electrodes in both parts are scanned, and the right eye image is displayed in the second field following the first field. The first and second fields constitute one frame of the displayed image. The image is written on the pixels in a selecting period, held in a holding period and eliminated in an eliminating period.

Each scanning electrode is sequentially scanned one by one with a shift time, or a time interval $\Delta t$, from the center of the panel toward both edges of the panel. The left eye image is written in the first field, and the right eye image is written in the second field, starting at a time after a certain period has lapsed from completion of the left eye image display. For example, the image on the first scanning electrode in the second field begins to be displayed at a time when $L\Delta t(L>1)$ has passed after the image display on the last scanning electrode in the first field started. Alternatively, a same image such as a white image for both eyes is displayed on the scanning electrodes to be scanned at the end of each field. By employing the dual scanning and properly setting the display timing, the cross-talk images appear only in narrow regions at the vicinity of both edges of the display panel.

Further, timing for switching the eye shutter from one eye to the other is properly set to suppress the cross-talk images. For example, both the left and right eye shutters are closed until the images displayed on the last scanning electrodes scanned at the end of each field are eliminated. Alternatively, only one eye shutter is open and the other eye shutter is closed until a time immediately before the image for the other eye begins to be written. For example, only the left eye shutter is open until a time immediately before the right eye image begins to be written. In combination of proper display timing and eye shutter timing, the cross-talk is further suppressed.

A certain number of scanning electrodes, e.g., a pair of scanning electrodes may be simultaneously scanned to decrease the time required to display one field of image and to increase a frame frequency. It is also possible to feed an image data, from an outside circuit, for showing a same image for both eyes on the scanning electrodes to be scanned at the end of each field.

The eye shutter may be structured so that its polarization axis automatically accords with a polarization axis of the image display panel, irrespective of its wearing angle relative to the horizontal line. A pair of round plates, each carrying a respective left and right eye shutter made of a liquid crystal panel, are rotatably mounted on an eye shutter plate. A weight is fixed on each round plate so that the round plate automatically rotates by gravity imposed on the weight, thereby placing the polarization axis to accord with the polarization axis of the display panel.

This invention may be applied also to a display panel in which single scanning is performed in place of the dual scanning. In the case of single scanning, the cross-talk images appear only on a limited number of scanning electrodes which are last scanned in each field. The voltage supplied to the scanning electrodes in the holding period may be lowered to decrease image brightness in the holding period, so that the cross-talk images are suppressed. Alternatively or in addition to decreasing the holding voltage, the image held in the holding period may be eliminated earlier to suppress the cross-talk images.

Other objects and features of the present invention will become more readily apparent from a better understanding of the preferred embodiments described below with reference to the following drawings.

BRIEF DESCRIPTION OF THE DRAWINGS

FIG. 38 is a schematic diagram showing images displayed by the conventional device when a left eye image is switched to a right eye image.

DETAILED DESCRIPTION OF THE PREFERRED EMBODIMENTS

First Embodiment

Figure 1:
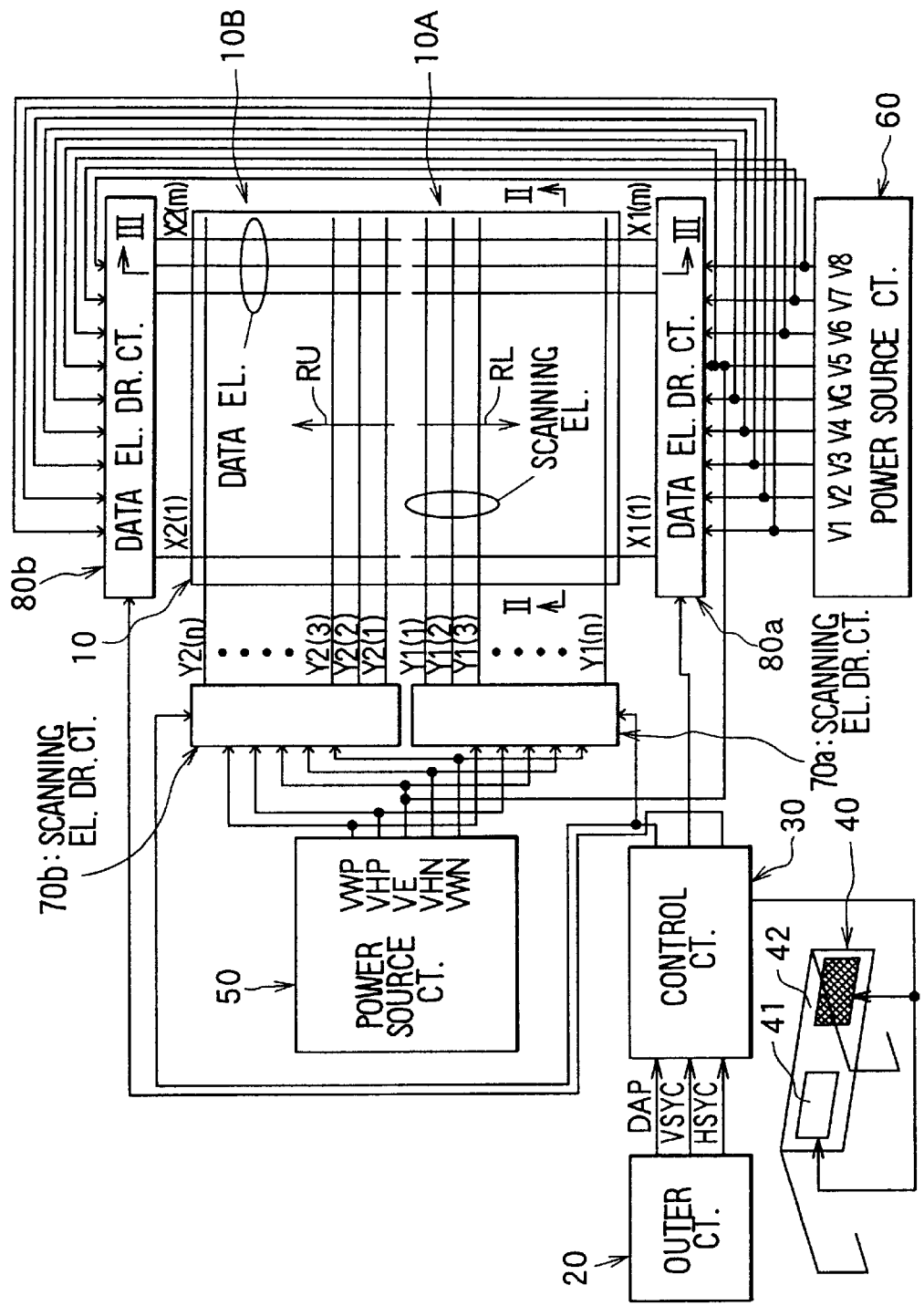
FIG. 1 is a block diagram showing a stereoscopic image display device according to the present invention.

A first embodiment of the present invention will be described with reference to FIGS. 1–17. First, referring to FIG. 1, the whole structure of a stereoscopic image display device according to the present invention will be described. A stereoscopic image display device is composed of: a liquid crystal panel 10; scanning electrode driving circuits 70a, 70b connected to scanning electrodes of the panel 10; a power source circuit 50 for supplying voltage to the scanning electrode driving circuits 70a, 70b; data electrode driving circuits 80a, 80b connected to data electrodes of the panel 10; another power source circuit 60 for supplying voltage to the data electrode driving circuits 80a, 80b; a control circuit 30 for controlling both driving circuits; an eye shutter 40 to be worn by a viewer; and an outer circuit 20 connected to the control circuit 30. The structure and operation of these components and circuits will be described below.

Figure 2:
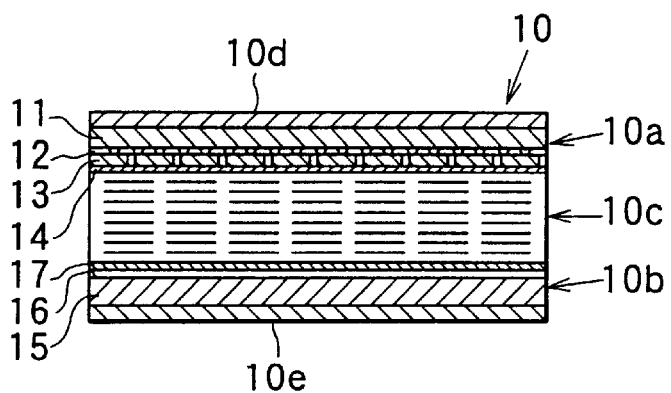
FIG. 2 is a cross-sectional view, taken along line II—II in FIG. 1, showing a structure of a liquid crystal display panel used in the device shown in FIG. 1.
Figure 3:
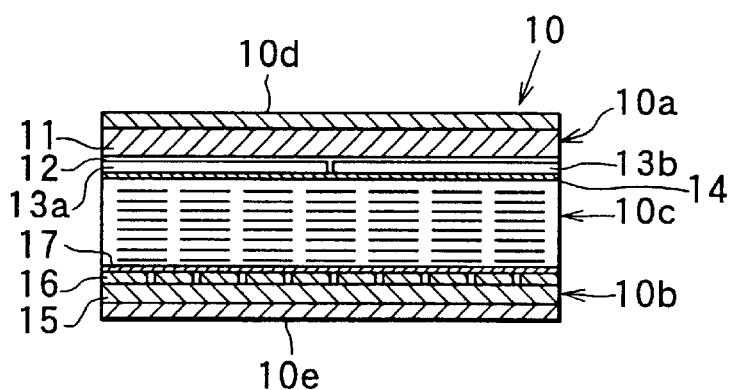
FIG. 3 is a cross-sectional view, taken along line III—III in FIG. 1, showing a structure of the liquid crystal display panel.

As shown in FIGS. 2 and 3, the liquid crystal panel 10 is made by laminating various layers and enclosing liquid crystal therein. An upper electrode plate 10a is composed of: a glass substrate 11; a color filter layer 12 having 2m stripes of R, G and B filters; transparent electrodes 13a, 13b (shown in FIG. 3), each having m stripes; and an orientation film 14, all laminated in this order from the top. A lower electrode plate 10b is composed of: a glass substrate 15; transparent electrodes 16 having 2n stripes; and an orientation film 17, all laminated in this order from the bottom. A polarizer plate 10d is attached to the upper surface of the upper electrode plate 10a, and another polarizer plate 10e is attached to the bottom surface of the lower electrode plate 10b. An enclosed space between the upper and lower electrode plates is filled with antiferroelectric liquid crystal 10c.

Figure 4:
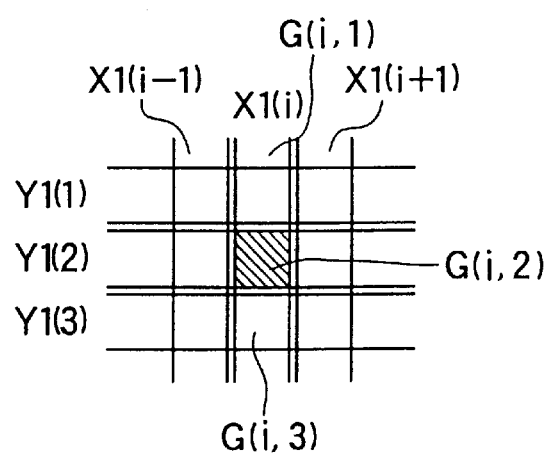
FIG. 4 is a schematic view showing an arrangement of pixels in a lower part of the display panel.
Figure 5:
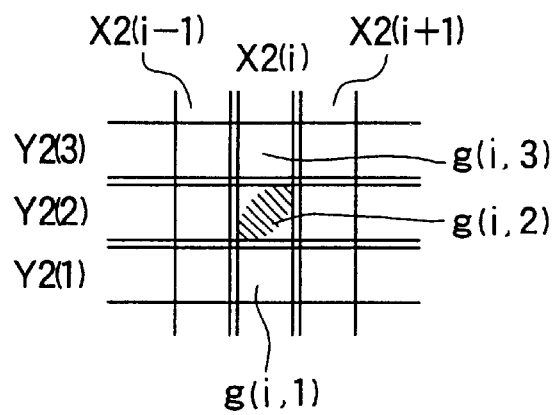
FIG. 5 is a schematic view showing an arrangement of pixels in an upper part of the display panel.

As shown in FIG. 1, the panel 10 includes a lower part 10A and an upper part 10B. The transparent electrodes 16 having 2n stripes are divided into two parts, scanning electrodes Y1(1)–Y1(n) located in the lower part 10A and scanning electrodes Y2(1)–Y2(n) located in the upper part 10B. The transparent electrodes 13a constitute data electrodes X1(1)–X1(m) located in the lower part 10A and the transparent electrodes 13b constitute data electrodes X2(1)–X2(m) located in the upper part 10B. In this particular embodiment, the scanning electrodes run in the horizontal direction, and the data electrodes run in the vertical direction. The scanning and data electrodes are perpendicular to each other. In the lower part 10A of the panel 10, m×n pixels, G(1, 1), G(1, 2) . . . G(m, n) are formed at cross-sections of the scanning electrodes Y1(1)–Y1(n) and the data electrodes X1(1)–X1(m) together with the liquid crystal 10c, as shown in FIG. 4. Similarly, in the upper part 10B, m×n pixels, g(1, 1), g(1, 2) . . . g(m, n) are formed at cross-sections of the scanning electrodes Y2(1)–Y2(n) and the data electrode X2(1)–X2(m) together with the liquid crystal 10c, as shown in FIG. 5. In the panel 10 as a whole, m×2n pixels are formed, and accordingly a dot matrix image with m×2n picture elements can be displayed on the panel 10.

Both the polarizer plates 10d and 10e are attached to the panel, so that the light axis is set to a crossed Nicol position. Accordingly, the antiferroelectric liquid crystal 10c intercepts light when the liquid crystal is in the antiferroelectric state. The light enters into the panel 10 from the polarizer plate 10e side and is emitted from the polarizer plate 10d. The polarization axis of the polarizer plate 10d extends in the horizontal direction when the panel 10 is vertically placed. Both the upper and lower electrode plates 10a and 10b are supported by spacers (not shown) positioned therebetween, so that the space between both electrode plates is uniformly maintained at about 2 micrometers.

As the antiferroelectric liquid crystal 10c, a material such as the following material disclosed in JP-A-5-119746 may be used.

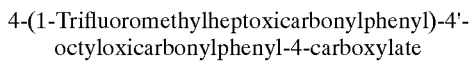

Figure 15:
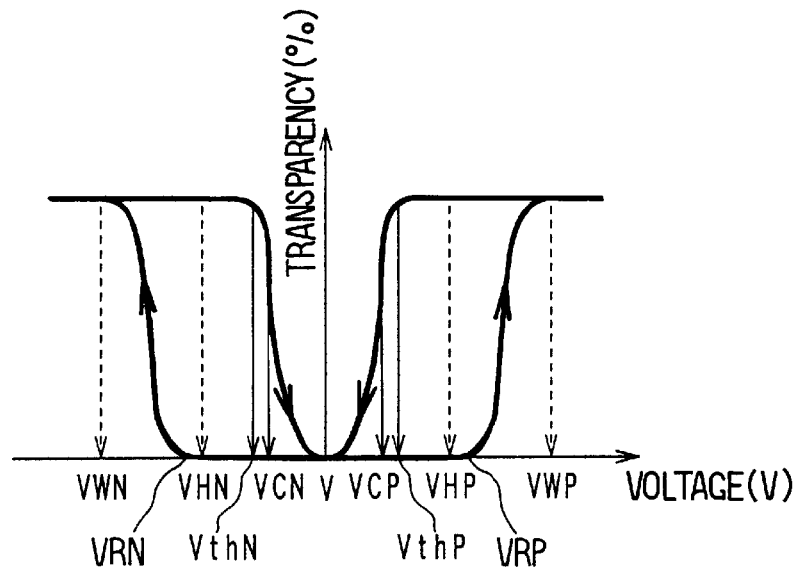
FIG. 15 is a graph showing relation between driving voltage and transparency of antiferroelectric liquid crystal used in the display panel.

4-(1-Trifluoromethylheptoxicarbonylphenyl)-4'-octyloxicarbonylphenyl-4-carboxylate A mixture of several antiferroelectric liquid crystals of this kind or a liquid crystal that includes at least one kind of antiferroelectric liquid crystal may be used as the liquid crystal 10c filling the space in the panel 10. The antiferroelectric liquid crystal has a double hysteresis in its voltage-transparency characteristic as shown in FIG. 15. That is, it shows the highest transparency at a voltage VWP, and the highest transparency is maintained until the voltage is decreased to VthP (a threshold voltage) through a level VHP. When the voltage reaches VCP, the transparency decreases to about a half of the highest transparency. The transparency becomes the lowest level at a voltage V, and the lowest level is maintained from the voltage V to VRN (a minus value). At the voltage VRN the transparency starts to rise again, and at a voltage VWN the transparency becomes the highest level. When the voltage is increased again in the reverse direction, the highest transparency is maintained until the voltage reaches VthN through VHN. Then, the transparency becomes about half of the highest level when the voltage reaches VCN. At the voltage V, the transparency becomes the lowest level which is maintained until the voltage reaches VRP. The transparency starts to rise again at VRP and reaches the highest level at VWP. The display panel having the antiferroelectric liquid crystal is driven by imposing the voltage having a waveform including a base voltage VE, and voltages VWP (VWN), VHP (VHN) as shown in the upper graph of FIG. 16, so that the transparency of the liquid crystal becomes as shown in the lower graph of FIG. 16.

Figure 6:
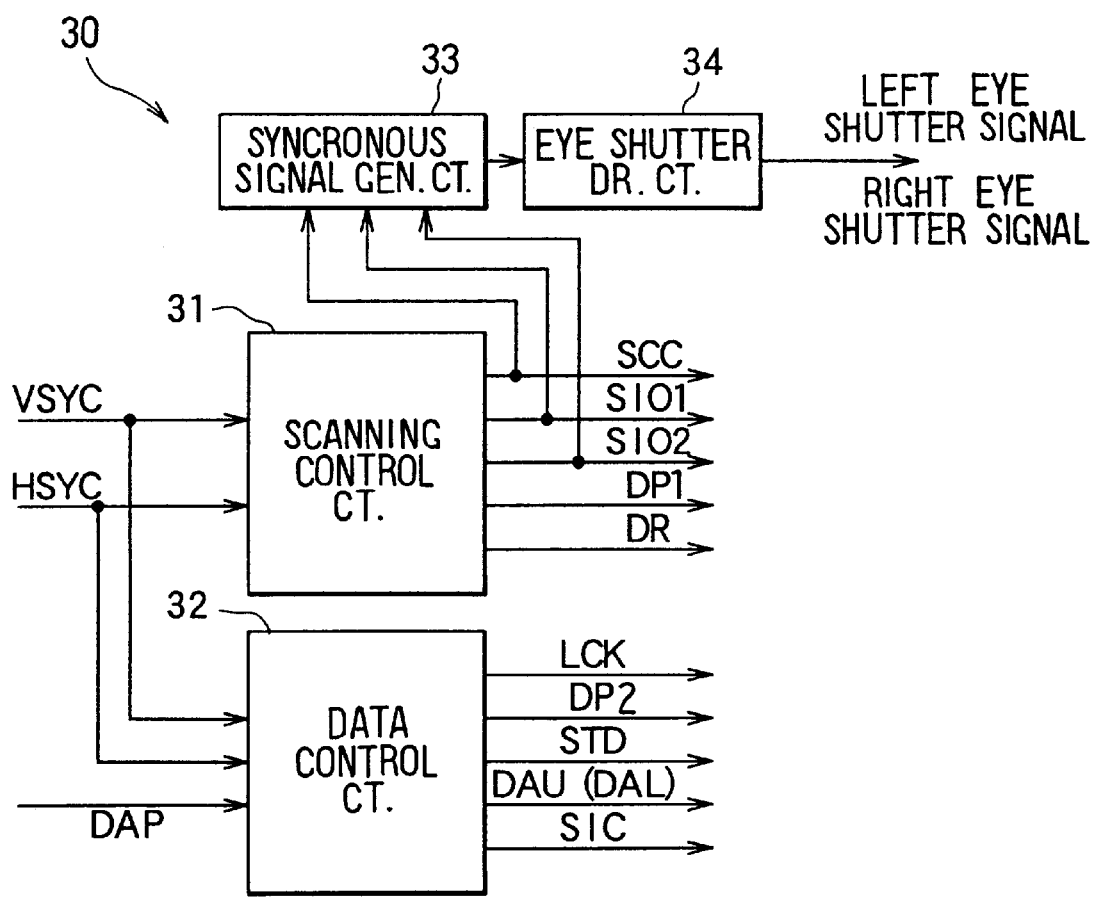
FIG. 6 is a block diagram showing a control circuit used in the device shown in FIG. 1.

The control circuit 30 for controlling the display panel 10 is shown in FIG. 6. It includes. a scanning control circuit 31, a data control circuit 32, a synchronous signal generating circuit 33 and an eye shutter driving circuit 34. The scanning control circuit 31 receives a vertical synchronous signal VSYC, a horizontal synchronous signal HSYC from the outer circuit 20 and outputs signals DP1, DR, SIO1, SIO2 and SCC to both scanning electrode driving circuits 70a and 70b. The data control circuit 32 receives the vertical synchronous signal VSYC, the horizontal synchronous signal HSYC and an image data signal DAP (including left and right eye signals) from the outer circuit 20 and outputs signals LCK, STD, DP2, SIC and DAL (or DAU) to both data electrode driving circuits 80a and 80b. The SIO1 and SIO2 signals determine the states of the scanning electrodes Y1(1)–Y1(n) and Y2(1)–Y2(n), respectively. That is, when both the SIO1 and SIO2 signals are at a low level (L), the scanning electrodes are in an eliminating period. When the SIO1 signal is at a high level (H) and the SIO2 signal is L, the scanning electrodes are in a selecting period. When both the SIO1 and SIO2 signals are H, the scanning electrodes are in a holding period. The display panel 10 is driven with field frequency of, e.g., 120 Hz, each field showing a left eye image or a right eye image. The lower and upper parts 10A and 10B of the panel 10 are simultaneously scanned in the manner described later.

Figure 11:
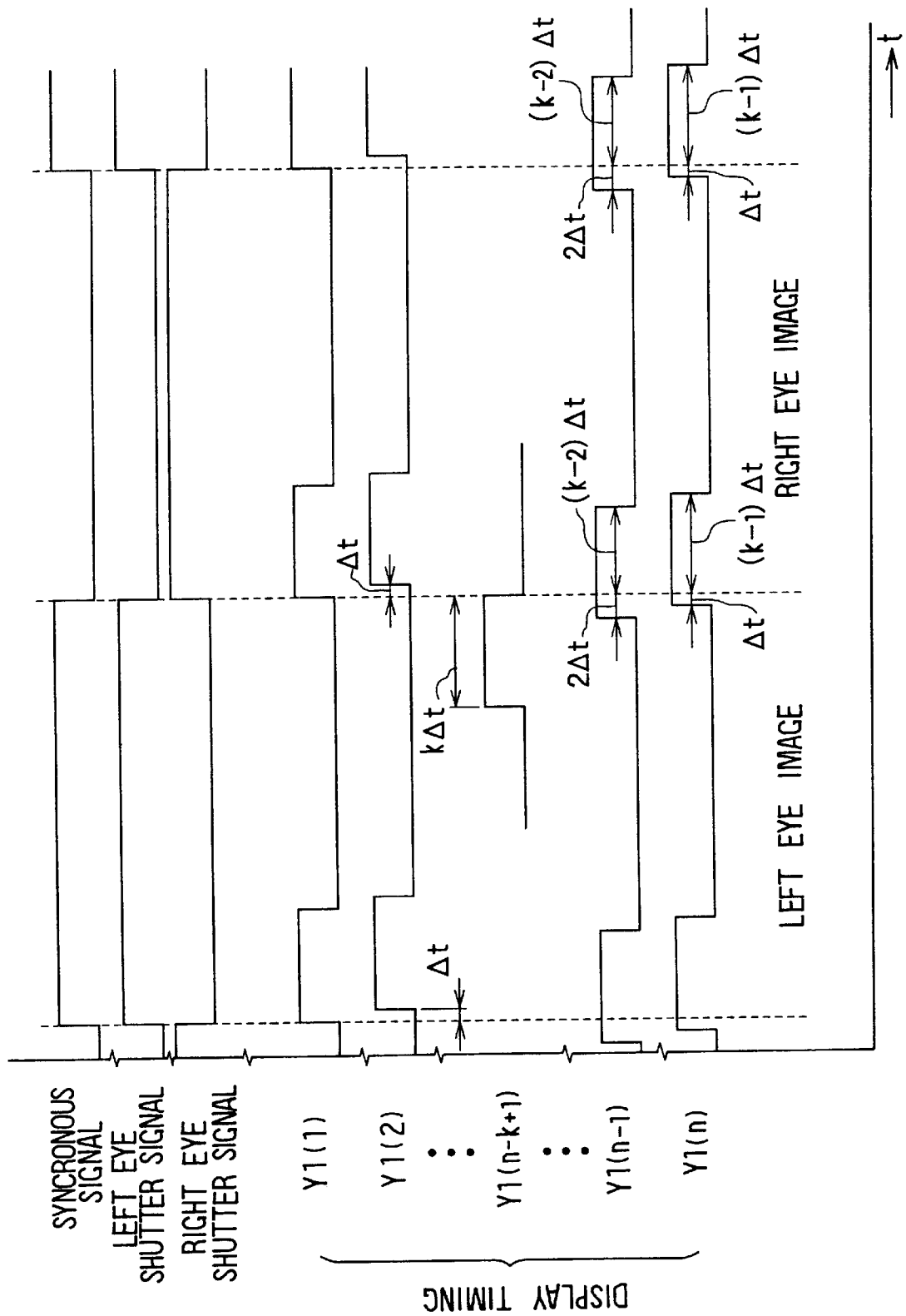
FIG. 11 is a timing chart showing operation of an eye shutter and an image display panel in a first embodiment.

The synchronous signal generating circuit 33 receives the signals SIO1, SIO2 and SCC from the scanning control circuit 31 and generates a rectangular synchronous signal as shown in FIG. 11. The eye shutter driving circuit 34 generates a left eye shutter signal shown in FIG. 11 in synchronism with rising-up of the synchronous signal, and turns off a right eye shutter signal at the same time. The eye shutter driving circuit 34 generates the right eye shutter signal in synchronism with the falling-down of the synchronous signal and turns off the left eye shutter signal.

The eye shutter 40 having the left and right eye shutters 41, 42 is worn by a viewer and is driven by the eye shutter driving circuit 34. The left and right eye shutters 41, 42 are opened or closed according to the left eye and right eye shutter signals, respectively. That is, each eye shutter 41, 42 is open when the corresponding eye shutter signal is present, while it is closed when the signal is turned off. In other words, the eye shutters 41, 42 are alternately opened and closed in synchronism with the synchronous signal. Each eye shutter 41, 42 is constituted by a liquid crystal panel in this particular embodiment.

Referring to FIG. 11, the eye shutter timing and image display timing on the panel 10 will be explained. Since the lower part 10A and the upper part 10B are identical, the timing in the lower part 10A is shown in FIG. 11 and in similar following drawings as a representative. The lower panel 10A is scanned from the scanning electrode Y1(1) toward Y1(n), while the upper panel 10B is scanned from Y2(1) toward Y2(n). In synchronism with opening of the left eye shutter 41, a left eye image is shown on the first scanning line Y1(1). Thereafter, the left eye image is sequentially shown on the following scanning electrodes with a time interval of $\Delta t(=t1+2\times t2)$. The image is shown on each scanning electrode for a certain period (a selecting period plus a holding period, which will be explained later) and is eliminated after the lapse of that period. Thus, the left eye image is shown on the last scanning electrode Y1(n) when a time period $(n-1)\times \Delta t$ has lapsed after the left eye image is shown on the first scanning electrode Y1(1). When a time period $n\times \Delta t$ has lapsed after the left eye image is shown on Y1(1), namely, all the electrodes Y1(1)–Y1(n) are scanned,
the right eye image is shown on the first electrode Y1(1), and the left eye shutter 41 is closed and the right eye shutter 42 is opened at the same time. Thereafter, the right eye image is sequentially shown on all the scanning electrodes Y1(1)–Y1(n) in the same manner as the left eye image. The upper part 10B of the panel 10 is scanned simultaneously with the lower part 10A in the same manner. As shown in FIG. 1, the lower part 10A is scanned in the direction RL, while the upper part 10B is scanned in the direction RU.

In this embodiment, the time period in which the image is shown on each scanning electrode is set to $k\times\Delta t(k>1)$. In this setting, the cross-talk appears on the electrodes from the bottom electrode Y1(n) to a (k–1)th electrode from the bottom in the lower part 10A, and on the electrodes from the top electrode Y2(n) to a (k–1)th electrode from the top in the upper part 10B. The cross-talk region can be made in a size that is not detrimental to display quality by properly selecting the value of k. The above-described operation of the panel including the k value is all controlled by the control circuit 30 and other circuits connected thereto.

The power source circuit 50 shown in FIG. 1 outputs five voltages VWP, VHP, VE, VHN, and VWN. Another power source circuit 60 also shown in FIG. 1 outputs nine voltages V1–V8 and VG for displaying an 8-step image. The scanning electrode driving circuit 70a (70b) receives signals DP1, DR, SIO1, SIO2 and SCC from the scanning control circuit 31 and supplies voltages, corresponding to the selecting, holding and eliminating periods, sequentially to the scanning electrodes. The voltage polarities supplied to the scanning electrodes are switched every selecting period to drive the panel with alternating voltage.

Figure 12:
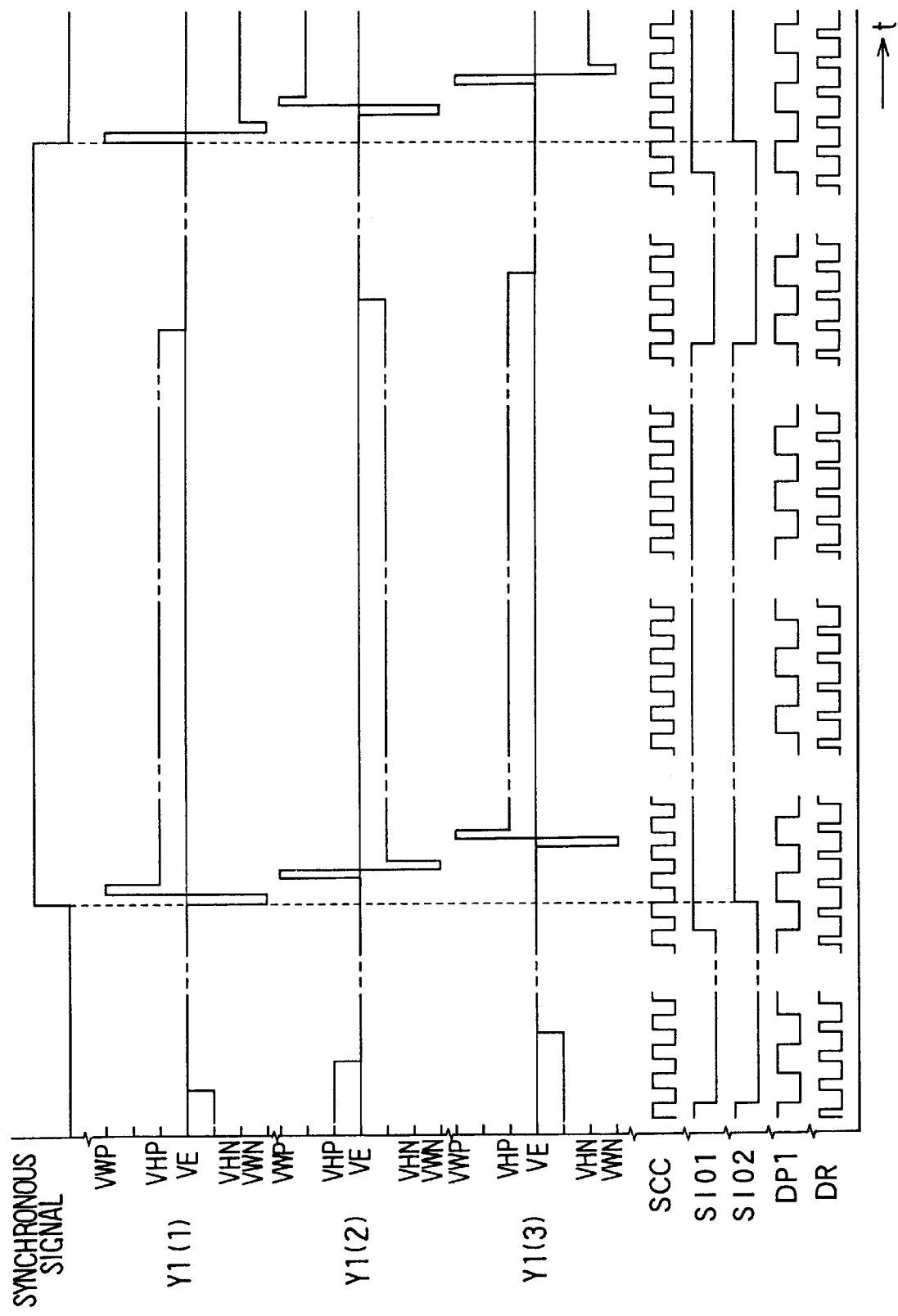
FIG. 12 is a timing chart showing operation of the scanning electrode driving circuit.

Referring to FIG. 12, operation of the scanning electrode driving circuit 70a will be described. Since the scanning electrode driving circuit 70b is identical to the scanning electrode driving circuit 70a, operation of the scanning electrode driving circuit 70a will be explained as a representative. Taking a scanning electrode Y1(1) as an example, the voltage VE is supplied to Y1(1) in the eliminating period to eliminate all the image data written on pixels on Y1(1). The selecting period is divided into three periods, the first, second and third periods. During the positive selecting period, the voltage VE that is the same as the eliminating voltage is supplied in the first period, a negative selecting voltage VWN in the second period, and a positive selecting voltage VWP in the third period. Image data are written on each pixel on Y1(1) by combining the scanning voltages and data voltages supplied to the data electrodes. During the positive holding period, a plus holding voltage VHP is supplied to Y1(1) to hold the image data written on the pixels. Then, the eliminating period follows, during which the eliminating voltage VE is supplied as mentioned above. A negative selecting period follows the eliminating period. During the negative selecting period, the voltage VE is supplied to Y1(1) in the first period, the positive selecting voltage VWP in the second period, and the negative selecting voltage VWN in the third period. Image data are written on each pixel by combination voltages supplied to the scanning and data electrodes. During the negative holding period, the negative holding voltage VHN is supplied to Y1(1) to hold the images written on the pixels.

As shown in FIG. 12, the similar scanning voltages supplied to Y1(1) are sequentially supplied to Y1(2) . . . Y1(n) with a time shift corresponding to the selecting period. The polarities of the scanning voltage are switched for every neighboring scanning electrode to suppress the image flicker. Namely, Y1(1) is scanned with the positive polarity, Y1(2) with the negative, Y1(3) with the positive, and so forth.

Figure 7:
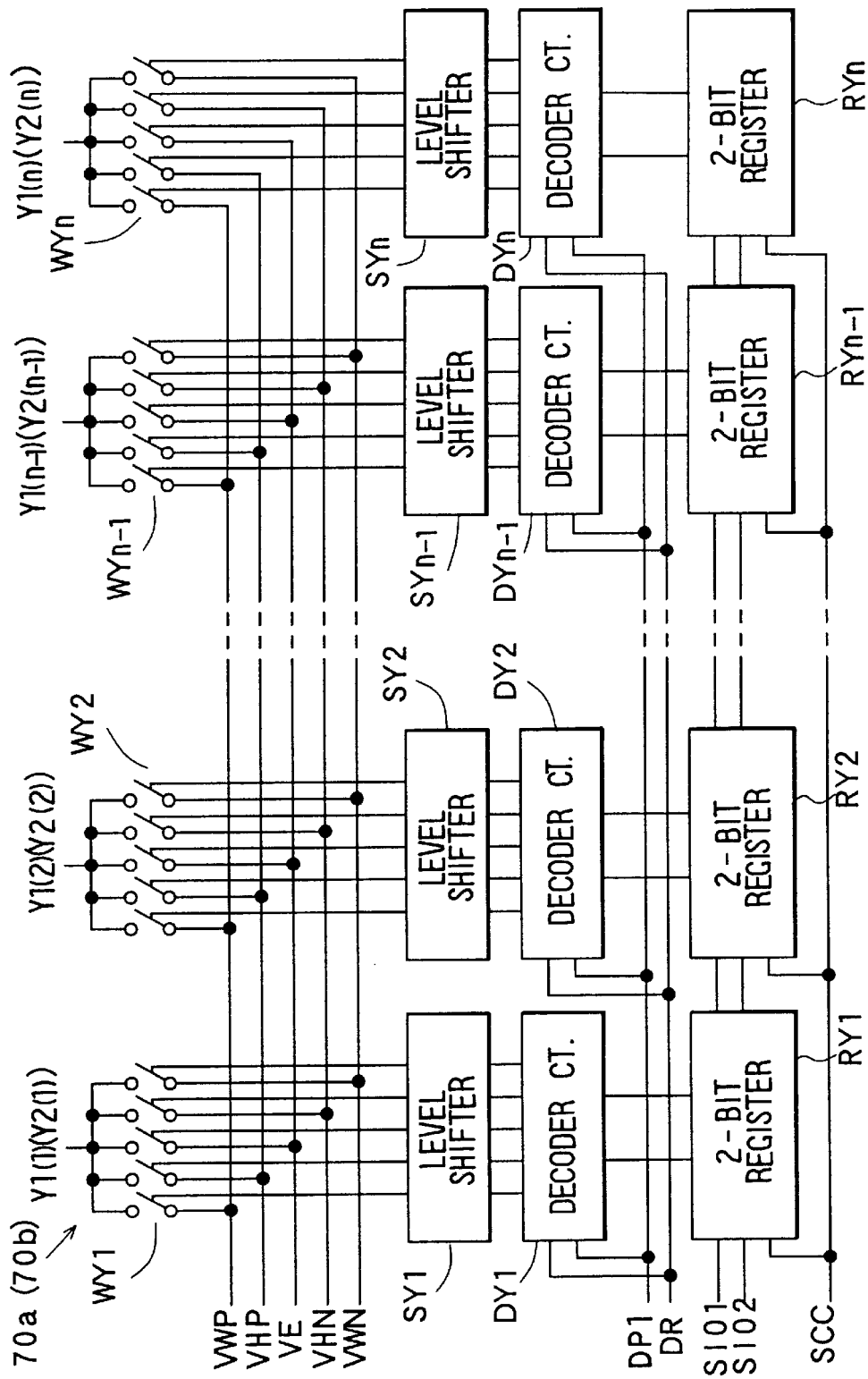
FIG. 7 is a circuit diagram showing a scanning electrode driving circuit used in the device shown in FIG. 1.

Referring to FIG. 7, the structure of the scanning electrode driving circuits 70a and 70b will be described. Since both driving circuits are identical, the scanning electrode driving circuit 70a is taken as a representative. The scanning electrode driving circuit 70a is composed of n 2-bit registers RY1–RYn, n decoder circuits DY1–DYn, n level shifters SY1–SYn, and n analog switch circuits WY1–WYn (each including five analog switches). The scanning electrode driving circuit 70a operates in the manner described above based on signals DP1, DR, SIO1, SIO2 and SCC supplied from the control circuit 30. Each 2-bit register RY1–RYn receives SIO1 and SIO2 signals in synchronism with the rising-up of the SCC signal and outputs 2-bit data (bit 1 and bit 2) to the corresponding decoder circuit DY1–DYn. Each decoder circuit generates five signals for switching each analog switch circuit, based on the 2-bit data from the 2-bit register and signals DP1 and DR supplied from the control circuit 30.

Figure 8:
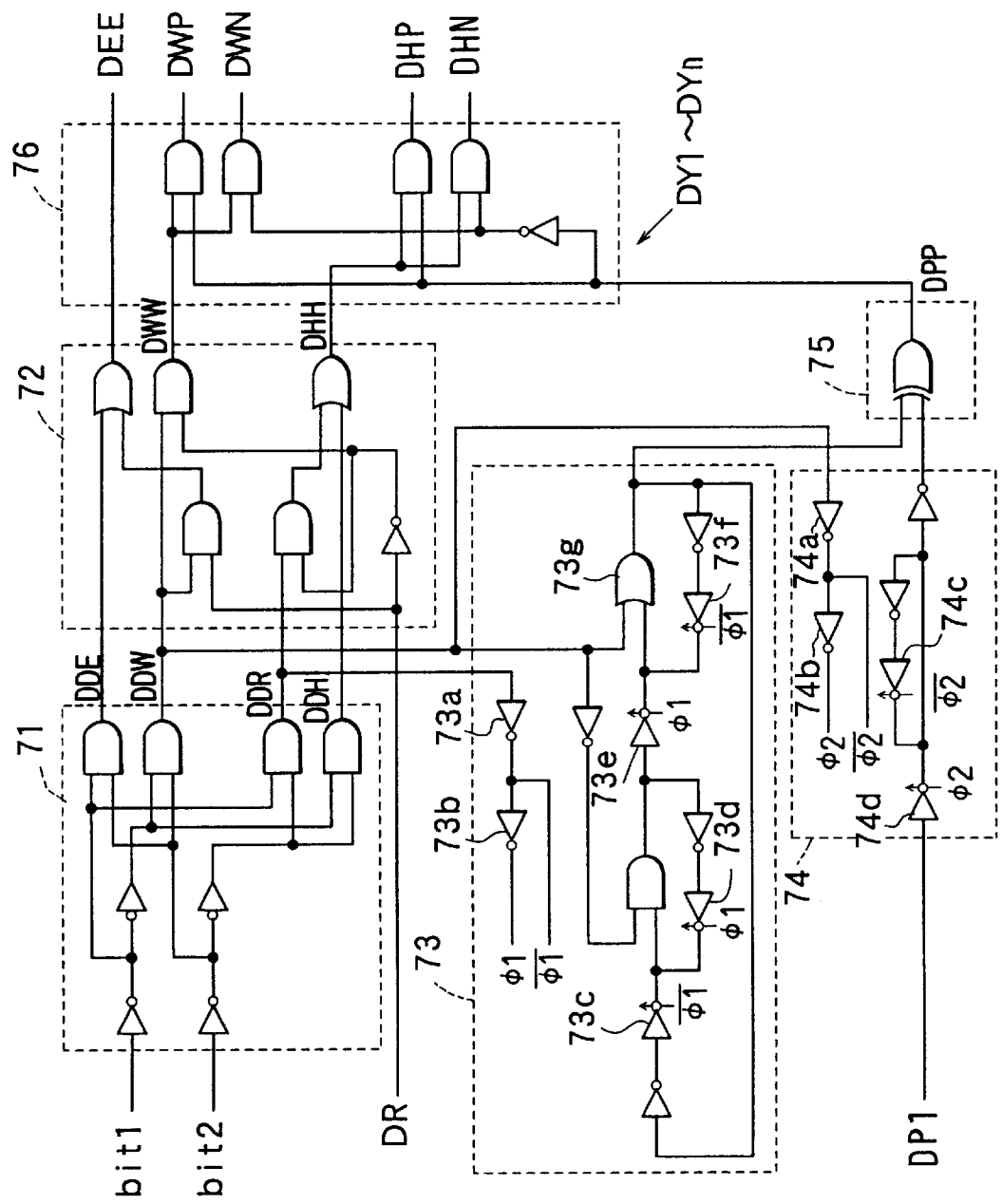
FIG. 8 is a circuit diagram showing a decoder circuit used in the scanning electrode driving circuit shown in FIG. 7.

Now, the decoder circuits DY1–DYn will be described in detail with reference to FIG. 8. Since all the decoder circuits are identical, the decoder circuit DY1 is taken as an example. The decoder circuit DY1 is composed of six logic circuits 71–76. As shown in FIG. 8, the logic circuit 71 consisting of four inverters and four AND gates outputs switching signals DDE, DDW, DDR and DDH by decoding the 2-bit signal (bit 1 and bit 2) received from the 2-bit register RY1. In the eliminating period (SIO1:L, SOI2:L), only the DDE signal becomes a high level (H). In the selecting period (SIO1:H, SOI2:L), only the DDW signal becomes H. In the holding period (SIO1:H, SIO2:H), only the DDH signal becomes H.

The logic circuit 72 consisting of an inverter, three AND gates and two OR gates, all connected as shown in FIG. 8, outputs signals DEE, DWW and DHH by controlling the switching signals fed from the logic circuit 71. When the DDE signal is H, only the DEE signal becomes H; when the DDW signal is H, only the DEE signal becomes H during a period in which the DR signal is H, and only the DWW signal becomes H during the period in which the DR signal is L; when the DDR signal is L, only the DHH signal becomes H; and when the DDH signal is H, only the DHH signal becomes H.

The logic circuit 73 consisting of components connected as shown in FIG. 8 is reset when the DDW signal is H and inverts the output of the OR gate 73g in synchronism with rising-up of the DDR signal. This operation is performed based on: operation of both clocked inverters 73c and 73f performed according to an inverted DDR signal from the inverter 73a; operation of both clocked inverters 73d and 73e performed according to an cascade output of both inverters 73a and 73b; and operation of other logic gates.

The logic circuit 74 connected as shown in FIG. 8 performs a data latch function. Namely, it outputs the DP1 signal as it is when the DDW signal is H and latches the DP1 signal when the DDW signal is L. This operation is performed based on: operation of the clocked inverter 74c performed according to the output of the inverter 74a to which the DDW signal is fed; operation of the clocked inverter 74d performed according to the cascade output from both inverters 74a and 74b; and operation of other logic gates.

The logic circuit 75 consisting of an exclusive OR gate outputs DPP signal that is an exclusive logic sum of the outputs from both logic circuits 73 and 74 to the logic circuit 76.

The logic circuit 76 consisting of an inverter and four AND gates switches polarities based on signals from the logic circuit 72 and the DPP signal from the logic circuit 75. When the DWW signal is H, the DWP signal becomes H if the DPP signal is H and the DWN signal becomes H if the DPP signal is L. When the DHH signal is H, the DHP signal becomes H if the DPP signal is H and the DHN signal becomes H if the DPP signal is L.

Thus, the decoder circuit DY1 outputs five control outputs DEE, DWP, DWN, DHP and DHN. The DEE signal controls, through the level shifter SY1, the analog switching circuit WY1 connected to the VE terminal of the power source circuit 50. In other words, the voltage VE is turned on and off by the switching circuit according to the DEE signal. Similarly, the signals DWP, DWN, DHP and DHN control switching of power source voltages VWP, VWN, VHP and VHN, respectively. When the level of control voltages DEE, DWP, DWN, DHP and DHN is high (H), the corresponding switch is turned on, and the respective power source voltages are supplied to the scanning electrodes, as shown in FIG. 12.

Figure 9:
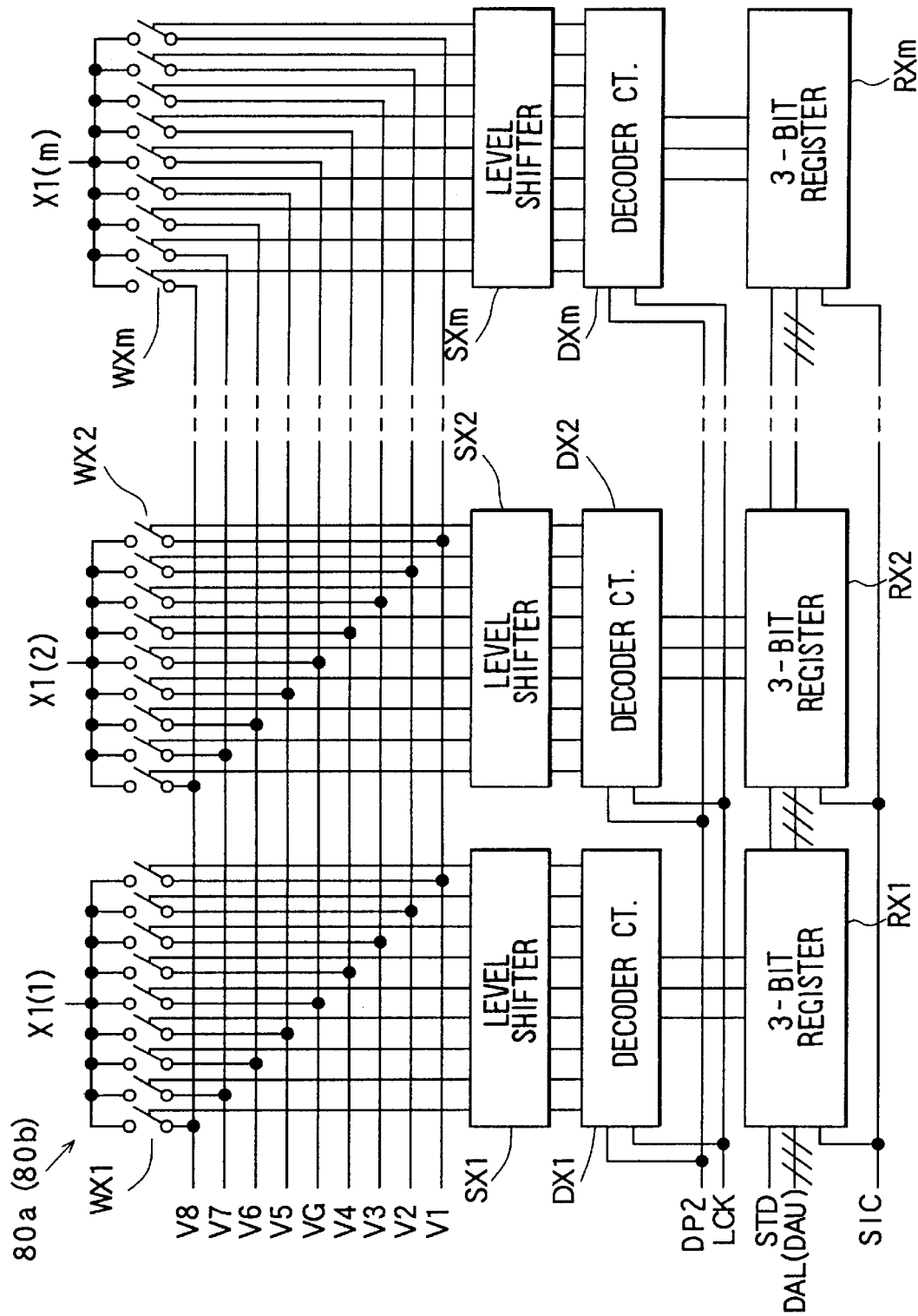
FIG. 9 is a circuit diagram showing a data electrode driving circuit used in the device shown in FIG. 1.

Referring to FIG. 9, the structure of the data electrode driving circuits 80a and 80b will be described. Since both circuits are identical, the data electrode driving circuit 80a will be described as a representative. The driving circuit 80a is composed of m 3-bit registers RX1–RXm, m decoders DX1–DXm, m level shifters SX1–SXm, and m analog switch circuits WX1–WXm (each consisting of nine analog switches). The driving circuit 80a supplies data signals to the data electrodes X1(1)–X1(m) corresponding to voltages VG and V1–V8 of the power source circuit 60, based on signals DAL (image data signal), DP2, LCK, STD and SIC fed from the control circuit 30. The image data signal DAL is a 3-bit signal to display an image with eight brightness steps. The image data signal DAU is supplied to the other data electrode driving circuit 80b in place of the image data signal DAL.

Figure 13:
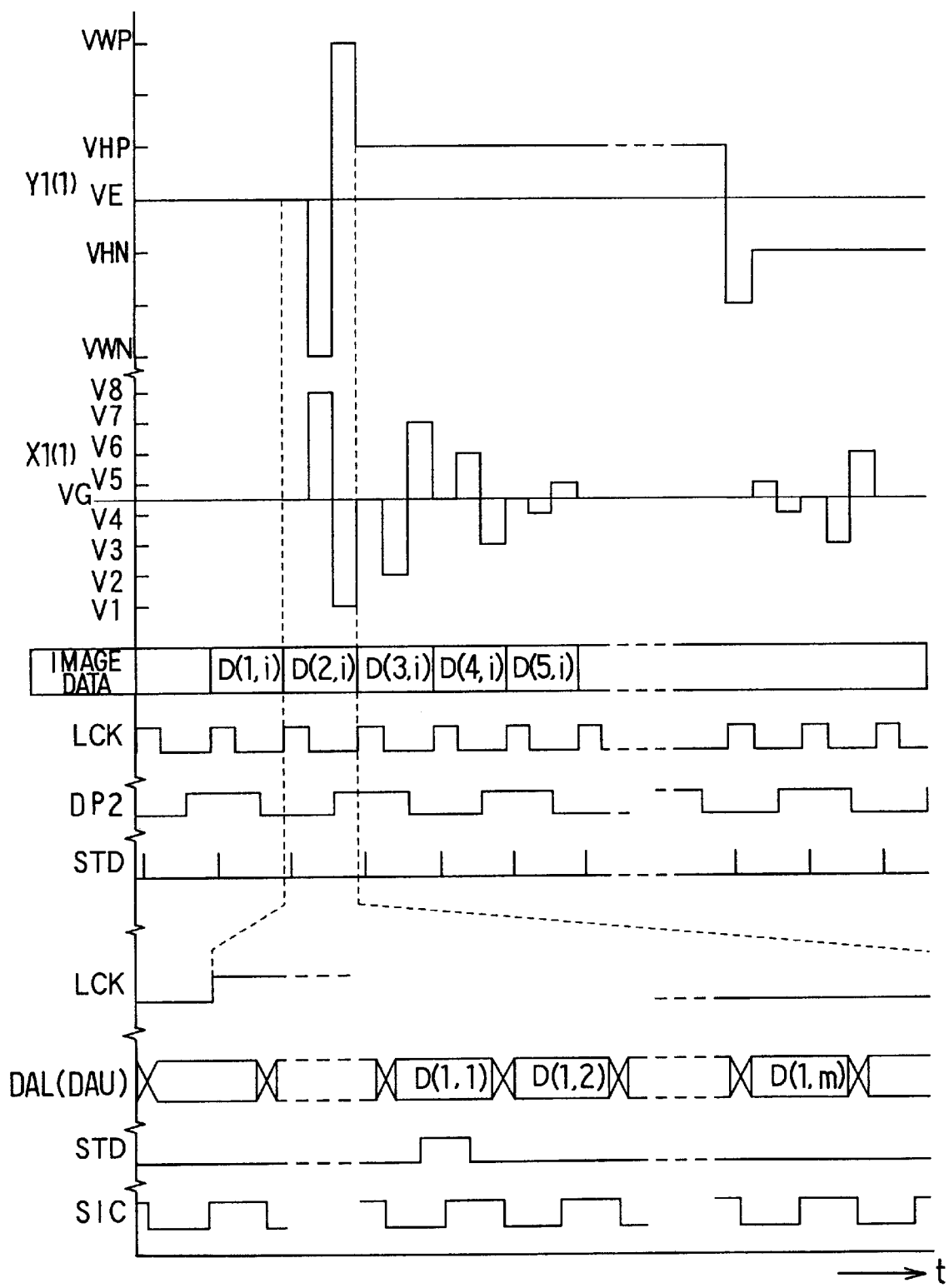
FIG. 13 is a timing chart showing operation of the data electrode driving circuit.

Operation of the data electrode driving circuit 80a will be explained with reference to FIG. 13. The 3-bit image data signal DAL for displaying an image with eight brightness steps is fed to the data electrode driving circuit 80a from the control circuit 30 in the form of series data to be supplied to the data electrodes X1(1)–X1(m). The image data signal DAL is fed to the data electrode driving circuit 80a to sequentially supply image data to pixels on the scanning electrodes Y1(1)–Y1(n) in accordance with scanning of the scanning electrodes. D(1, i) shown in FIG. 13 means a group of image data for pixels on the scanning electrode Y1(1), and D(1, 1) . . . D(1, m) mean an individual image data included in D(1, i), each corresponding to data electrodes X1(1) . . . X1(m), respectively. The image data signals D(1, 1) . . . D(1, m) are sequentially fed to the 3-bit registers RX1–RXm in synchronism with rising-up of the SIC signal and are stored therein. The image data stored in the 3-bit resisters are fed to the decoder circuits DX1–DXm.

Figure 10:
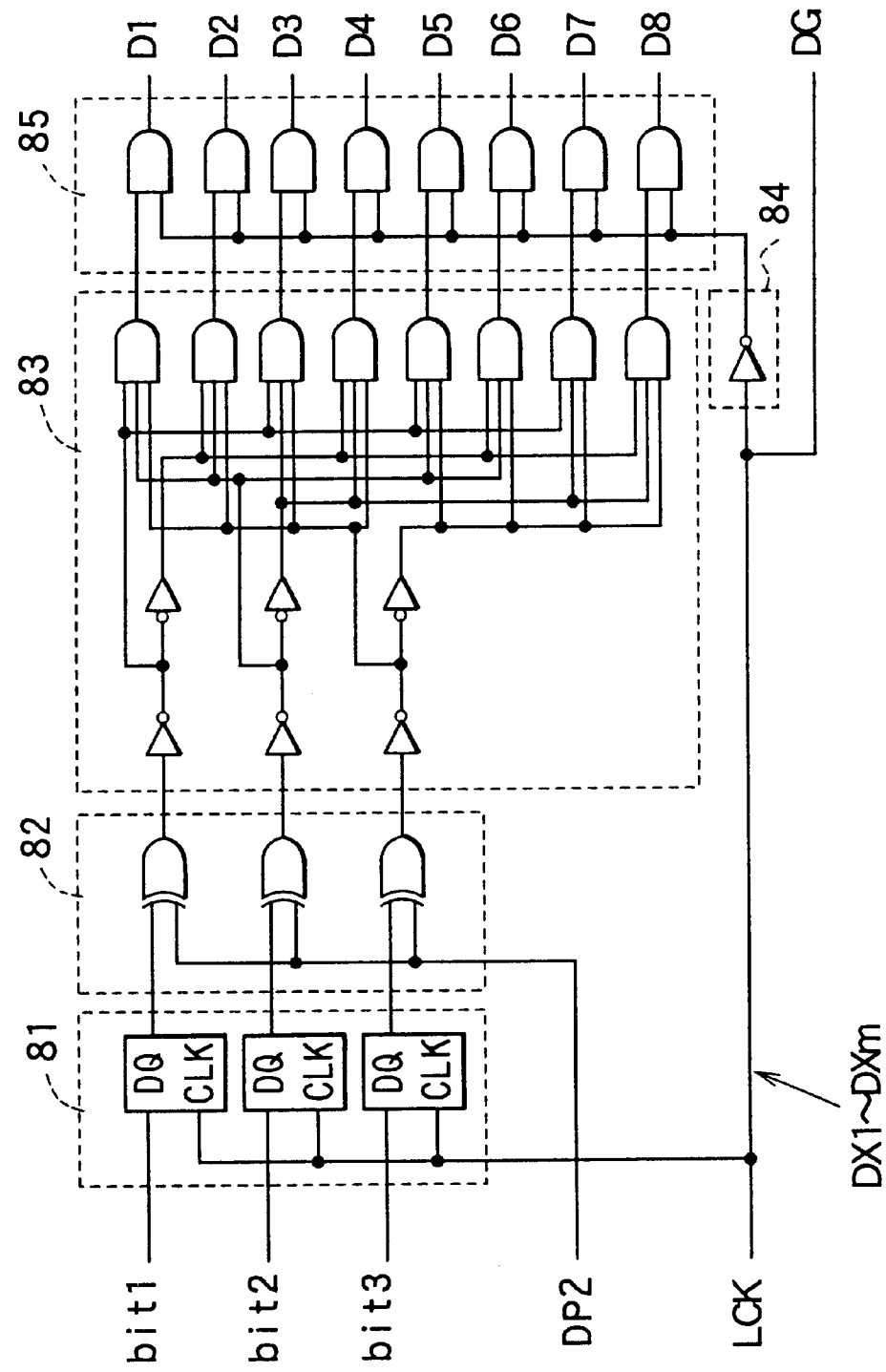
FIG. 10 is a decoder circuit used in the data electrode driving circuit shown in FIG. 9.

The decoder circuit is shown in FIG. 10. Since all the m decoder circuits are identical, the decoder circuit DX1 will be described as a representative. The decoder circuit DX1 is composed of five logic circuits 81–85. The logic circuit 81 consisting of three D-type flip-flop circuits latches 3-bit image data signal in synchronism with rising-up of the LCK signal from the control circuit 30. The logic circuit 82 consisting of three exclusive OR gates inverts the image data signal latched by the logic circuit 81, when the DP2 signal sent from the control circuit 30 is high (H). The logic circuit 83 is a decoder consisting of three pairs of inverters and eight AND gates. The logic circuit 83 decodes the 3-bit image data signal fed from the logic circuit 82 and converts it to eight line outputs. The logic circuit 84 consisting of an inverter inverts the LCK signal fed from the control circuit 30. The logic circuit 85 consisting of eight AND gates receives outputs from the logic circuits 83 and 84, and outputs eight control signals D1–D8 for switching eight analog switches in the analog switching circuit WX1. The decoder circuit DX1 also outputs the LCK signal as a control signal DG.

The decoder circuit DX1 having the structure described above makes the control signals D1–D8 high (H) corresponding to the 3-bit data (L, L, L), (L, L, H) . . . (H, H, L), (H, H, H) latched by the logic circuit 81, when the DP2 signal is L and the LCK signal is L. It makes control signals D8–D1 high (H) corresponding to the same 3-bit data, when the DP2 signal is H and the LCK signal is L. When the LCK signal is H, the control signals D1–D8 become L and the output DG becomes H, not depending on the 3-bit data. The control signals D1–D8 and DG control, through the level shifter, respective analog switches connected to the voltages V1–V8 and VG of the power source circuit 60. That is, when the control signals D1–D8 and DG are H, the corresponding analog switches are turned on and the corresponding voltages V1–V8 and VG are supplied to the data electrodes. The 3-bit registers RX1–RXm receive image data for pixels on the scanning electrode Y1(2) next to the scanning electrode Y1(1) after the image data signal is latched by the logic circuit 81 in synchronism with rising-up of the LCK signal. Thus, the voltages shown in FIG. 13 are supplied to the data electrodes X1(1)–X2(m), according to the signals SIC, STD, LCK, DP2 and image data signal DAL.

Figure 14:
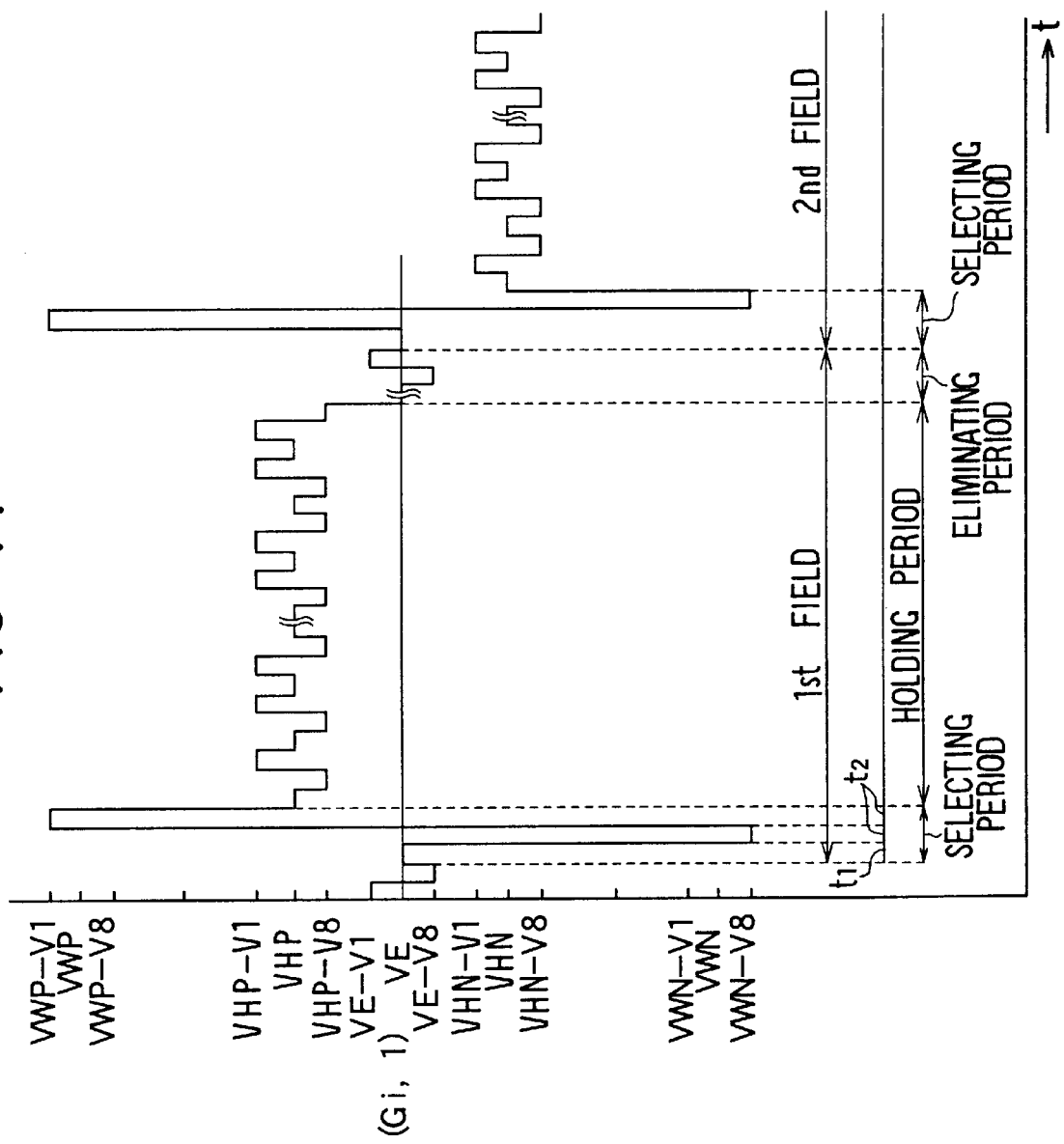
FIG. 14 is a timing chart showing waveforms of driving voltage imposed on a pixel G(i, 1), when the pixel is in a bright state.

Referring to FIG. 14, operation of the stereoscopic display panel 10 will be described, assuming that the frame display frequency is 60 Hz (one frame image is displayed for 16.6 ms), the number of the scanning electrodes is 512, and the number of the data electrodes is 640. On the pixels G(i,j) located in the lower part 10A and the pixels g(i,j) located in the upper part 10B, combined voltages shown in FIG. 14 are imposed. The combined voltages imposed on the pixels are composed of those imposed in the selecting period, holding period and the eliminating period. One frame includes the first field for displaying a left eye image and the second field for displaying a right eye image.

In the first field, the voltage VE having pulse width t1 (2 $\mu$s), the voltage VWN having pulse width t2 (15.2 $\mu$s) and the voltage VWP having pulse width t2 are supplied to the scanning electrodes in this order in the selecting period, and then the voltage VHP is supplied in the holding period (29×(t1+2×t2)). Then, the eliminating voltage VE is supplied in the eliminating period (226×(t1+2×t2)). In the second period, the same voltages having an opposite polarity are similarly supplied to the scanning electrodes.

The image data voltages supplied to the data electrodes in the selecting period are composed of three pulses having pulse width t1, t2 and t2, respectively, because the scanning voltages imposed in the selecting period are composed of three pluses. To display a bright image in the first field, the voltage VG having pulse width t1, the Voltage V8 having pulse width t2 and the voltage V1 having pulse width t2 are supplied to the data electrodes in this order. To display a dark image in the first field, the voltage VG having pulse width t1, the voltage V1 having pulse width t2 and the voltage V8 having pulse width t2 are supplied in this order. To display a bright image in the second field, the voltage VG having pulse width t1, the voltage V1 having pulse width t2 and the voltage V8 having pulse width t2 are supplied in this order. To display a dark image in the second field, the voltage VG having pulse width t1, the voltage V8 having pulse width t2 and the voltage V1 having pulse width t2 are supplied in this order.

Both the scanning voltages and the data signal voltages are combined into driving voltages that are imposed on the pixels. The polarities of the driving voltage are reversed one by one for neighboring scanning electrodes to improve visibility quality of the display. The combined driving voltages as shown in FIG. 14 are imposed on the pixel G(i, 1), and the driving voltages shifted or delayed by a period (t1+2×t2) are sequentially imposed on the following pixels G(i, 2), G(i, 3) . . . G(i, n). The antiferroelectric liquid crystal 10c is brought to the first stable state when the eliminating period ends. Similarly, the same driving voltages are imposed on the pixels g(i, 1), g(i, 2) . . . g(i, n) located in the upper part 10B of the panel 10.

Figure 17:
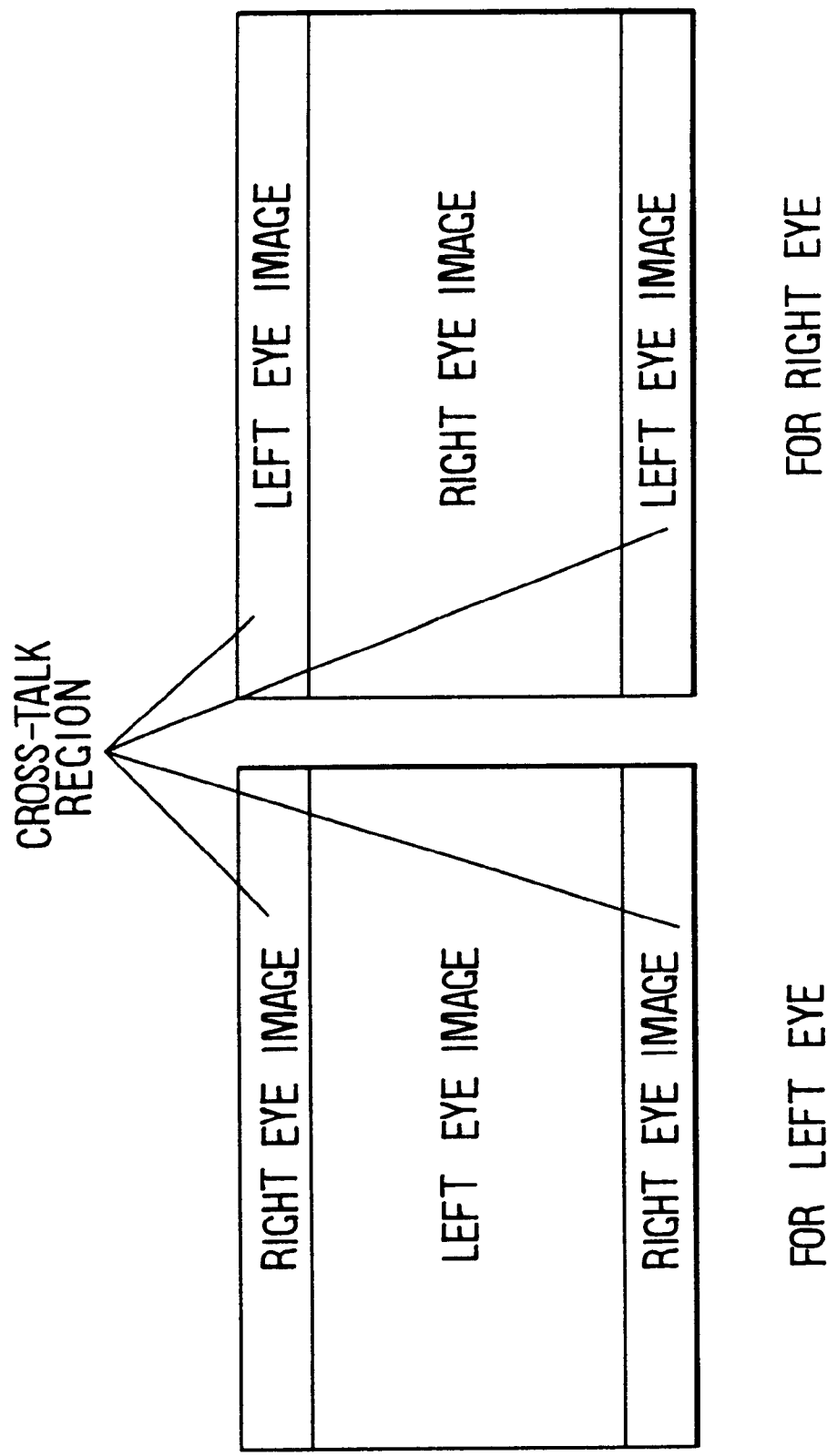
FIG. 17 is a schematic diagram showing cross-talk regions in right and left images displayed on the panel of the first embodiment.

As explained above with reference to FIG. 11, the left eye image is shown in the first field during which the left eye shutter 41 is open, while the right eye image is shown in the second field during which the right eye shutter 42 is open. One frame image consisting of the left and right eye images is displayed with the frame frequency of, e.g., 60 Hz. Thus, the images displayed on the panel 10 are recognized as stereoscopic images by a viewer wearing the eye the shutter 40. The lower part 10A of the panel 10 is scanned in the direction RL shown in FIG. 1, while the upper part 10B is scanned in the opposite direction RU at the same time. In other words, the panel 10 is simultaneously scanned from the center toward the lower and upper edges. Therefore, the cross-talk regions only appear at the upper and lower edges of the panel 10 as shown in FIG. 17. Moreover, the cross-talk regions can be made narrow by properly setting the value k as explained above. Therefore, a viewer can see the stereoscopic images shown on the panel 10 without being disturbed by the cross-talk.

Second Embodiment

Figure 18:
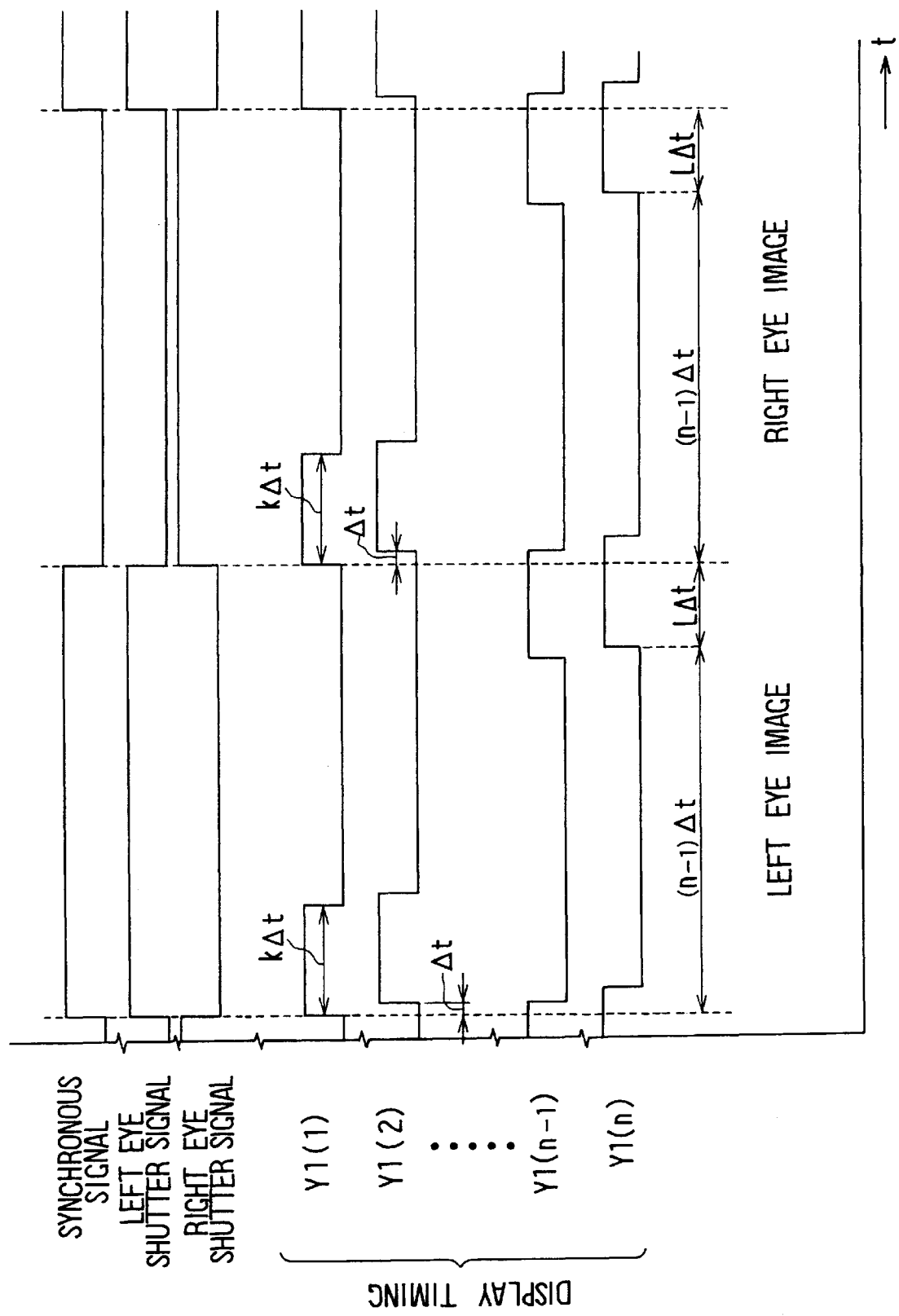
FIG. 18 is a timing chart showing operation of an eye shutter and an image display panel in a second embodiment.
Figure 19:
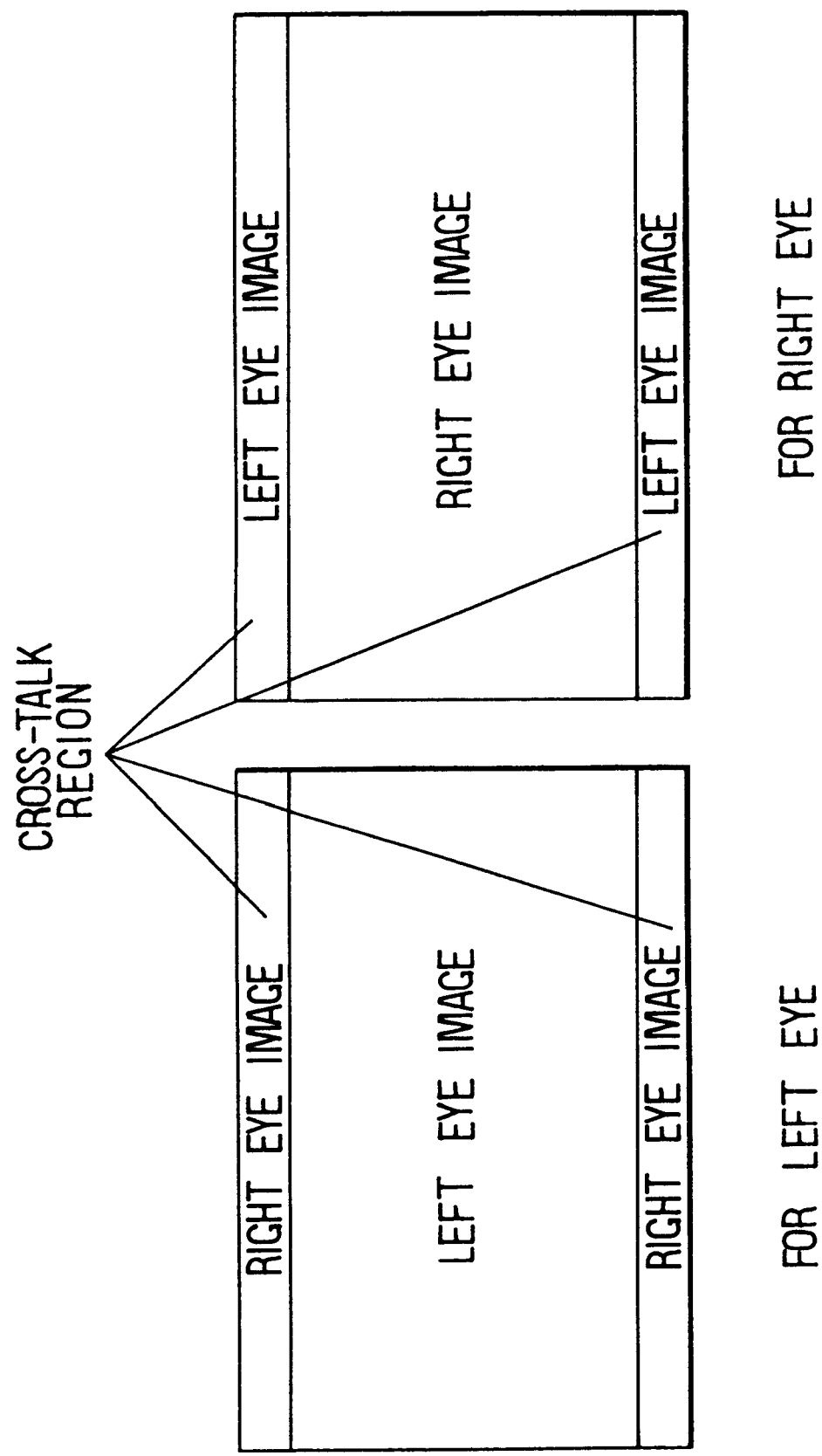
FIG. 19 is a schematic diagram showing cross-talk regions in right and left images displayed on the panel of the second embodiment.

Referring to FIGS. 18 and 19, a second embodiment of the present invention will be described. In this embodiment, the cross-talk regions are further reduced by delaying switch timing from one eye image to the other eye image. In the first embodiment, the right eye shutter 42 is opened (the left eye shutter 41 is closed) and display of the right eye image is started on the first scanning electrodes Y1(1), Y2(1) the shift time $\Delta$t after the left eye image display started on the last scanning electrodes Y1(n), Y2(n). In the second embodiment, as shown in FIG. 18, the time $\Delta$t is prolonged to L×$\Delta$t, where 1<L<k. Similarly, the left eye shutter 41 is opened (the right eye shutter 42 is closed) and display of the left eye image is started on the first scanning electrodes Y1(1), Y2(1) the shift time $\Delta$t after the right eye image display started on the last scanning electrodes Y1(n), Y2(n). This means that the time $\Delta$t in the first embodiment is prolonged by (L−1)×$\Delta$t to make it L×$\Delta$t in the second embodiment. The time (L−1)×t is referred to as blanking period.

Image display timing and shutter timing other than the timing mentioned above are the same as those in the first embodiment. That is, the scanning electrodes in the lower part 10A and the upper part 10B are simultaneously scanned from the center of the panel 10 toward both edges of the panel. The duration of time in which an image is displayed on each scanning electrode is k×$\Delta$t, and the scanning electrodes are scanned one by one with the shift time $\Delta$t.

As shown in FIG. 19, the cross-talk regions in the second embodiment are narrowed, compared with those in the first embodiment. That is, the cross-talk at the upper edge appears only on the scanning electrodes located in a region from the top electrode Y2(n) to a (k−L)th electrode counting from the top electrode Y2(n). Similarly, the cross-talk at the lower edge appears only on the scanning electrodes located in a region from the bottom electrode Y1(n) to a (k−L)th electrode counting from the bottom electrode Y1(n). By properly setting k and L, the cross-talk regions can be made reasonably narrow, so that the cross-talk is not recognized by a viewer.

Though the present invention is applied, in the first and second embodiments, to the display panel in which the dual scanning (the upper and lower parts of the panel are separately scanned) is performed, it may be applied to a display panel in which single scanning (one direction scanning from the top to the bottom, or vice versa) is performed. Also in the single scanning, the cross-talk region is narrowed and appears in a limited area of the last part of scanning, i.e., an area close to the upper edge or the lower edge of the panel.

Third Embodiment

Figure 20:
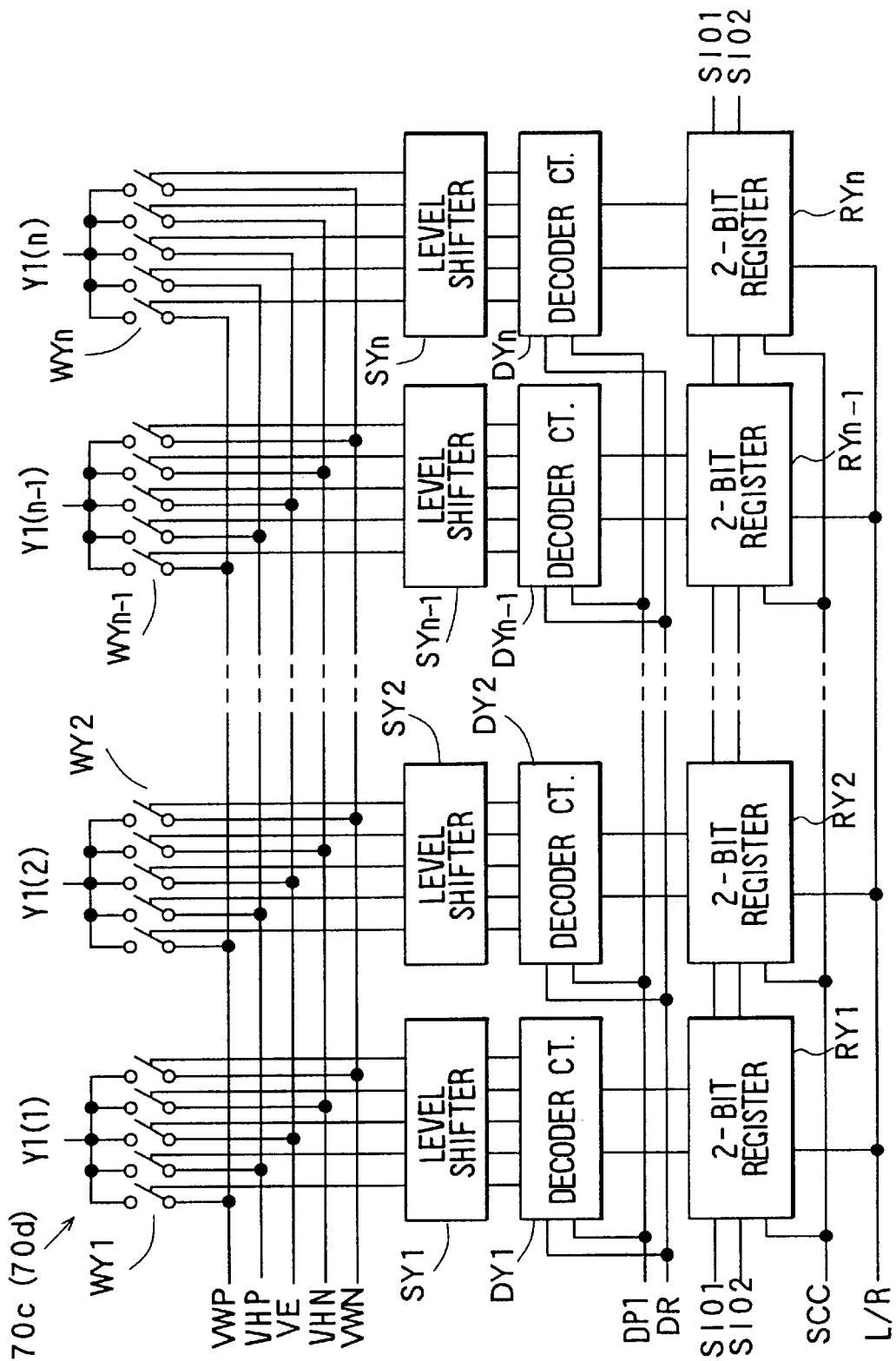
FIG. 20 is a circuit diagram showing a scanning electrode driving circuit of a third embodiment.
Figure 21:
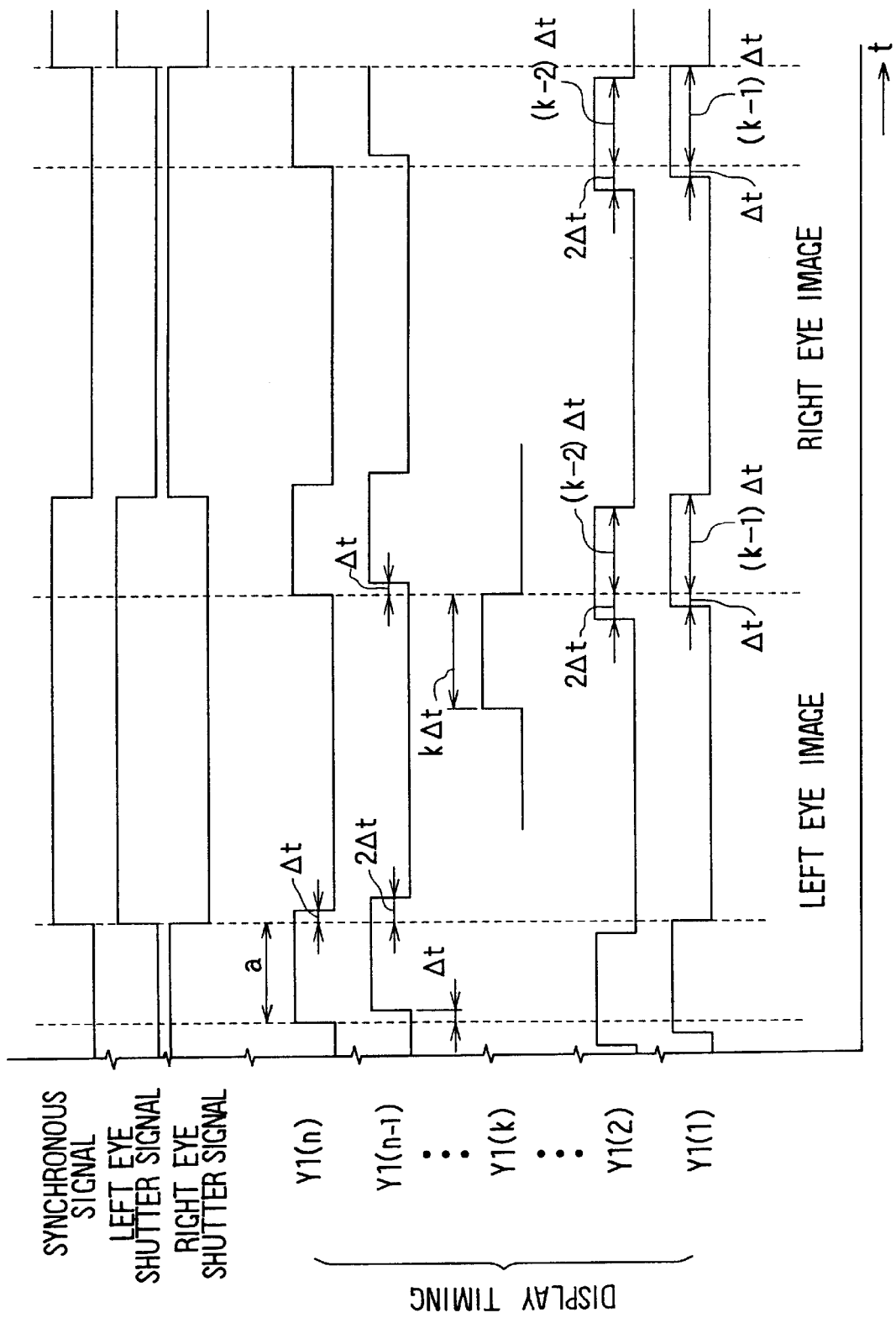
FIG. 21 is a timing chart showing operation of an eye shutter and an image display panel on the panel in the third embodiment.

Referring to FIGS. 20 and 21, a third embodiment of the present invention will be described. In this embodiment, the scanning electrode driving circuits 70a, 70b of the first embodiment are replaced with 70c, 70d. The SIO1 and SIO2 signals fed from one side (left side in the drawing) of the 2-bit register group in the first embodiment are fed from both sides of the 2-bit register group in the third embodiment. That is, the SIO1 and SIO2 signals are fed to the RY1 side and to the RYn side. Also, an L/R signal is additionally fed to each 2-bit register RY1–RYn. Other structures of the scanning electrode driving circuits 70c, 70d are the same as those of 70a, 70b.

When the L/R signal is H, the SIO1 and SIO2 signals are sequentially supplied to the 2-bit registers RY1–RYn in this order in synchronism with rising-up of the SCC signal, and the 2-bit data are fed to the decoder circuits DY1–DYn in this order. On the other hand, when the L/R signal is L, the SIO1 and SIO2 signals are sequentially supplied to the 2-bit registers in the reverse order, i.e., first to RYn and last to RY1, and the 2-bit data are fed to the decoder circuits also in the reverse order.

In the third embodiment, the scanning electrodes in the lower part 10A are scanned from the bottom toward the center of the panel 10, i.e., from Y1(n) toward Y1(1), as shown in FIG. 21. The scanning electrodes in the upper part 10B are scanned from the top toward the center of the panel 10, i.e., from Y2(n) toward Y2(1). Also, the eye shutter switch timing is delayed, compared with that of the first embodiment. As shown in FIG. 21, at the time when the image display on the last scanned electrodes Y1(1), Y2(1) is completed, the eye shutter 40 is switched from one eye to the other eye. In other words, the eye shutter 40 is switched at the time when the displayed image is about to be eliminated. During a period (denoted with "a" in FIG. 21) immediately before the left eye shutter 41 opens and the right eye shutter 41 closes, the left eye image is shown only on the scanning electrodes located very closely to the upper and lower edges of the panel 10. Accordingly, the cross-talk regions are limited to the far edges of the panel that are not detrimental to display quality.

Fourth Embodiment

Referring to FIGS. 22–25, a fourth embodiment of the present invention will be described. In this embodiment, the eye shutter 40 is replaced with an eye shutter 90 that has a pair of rotatable liquid crystal shutters 94, 95. The eye shutter 90 is composed of a main body 90a and a pair of frames 90b. The main body 90a is made of a non-transparent rectangular plate 91 that has a pair of round openings 91a, 91b for left and right eyes. A pair of non-transparent round plates 92, 93 are rotatably disposed in the respective round openings 91a, 91b. The round plate 92 carries a liquid crystal shutter 94 for the left eye, and the round plate 93 carries a liquid crystal shutter 95 for the right eye.

Figure 24:
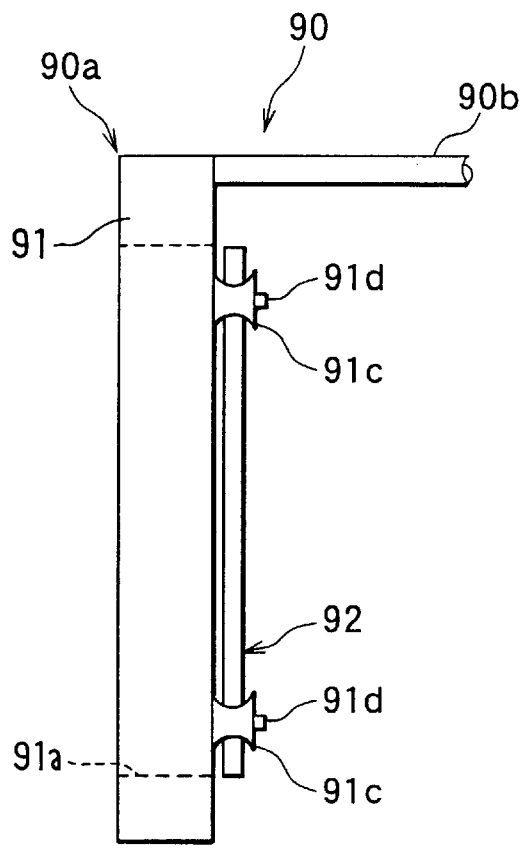
FIG. 24 is a side view showing the eye shutter shown in FIG. 22.

As shown in FIG. 24, the round plate 92 is rotatably supported by four rollers 91c in the round opening 91a. The rollers 91c are rotatably supported by pins 91d which are fixed to the rectangular plate 91. The outer periphery of the round plate 92 fits in a depressed concave surface of the rollers 91c, so that the round plate 92 does not fall off from the rollers 91c when it rotates. Similarly, the round plate 93 is rotatably supported by the four rollers 9le in the round opening 91b.

Figure 22:
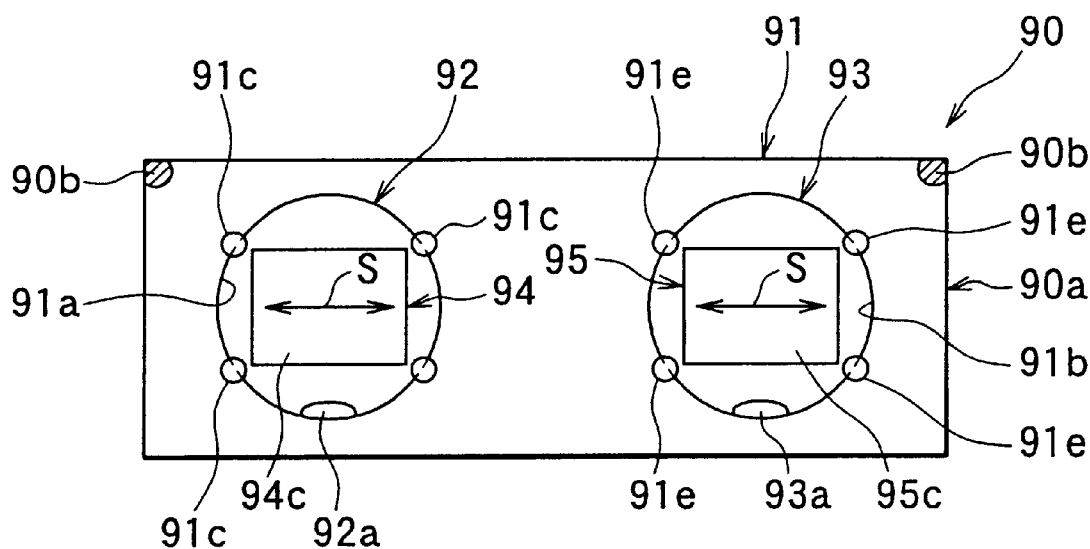
FIG. 22 is a plan view showing a liquid crystal eye shutter positioned in parallel to the horizontal line.
Figure 23:
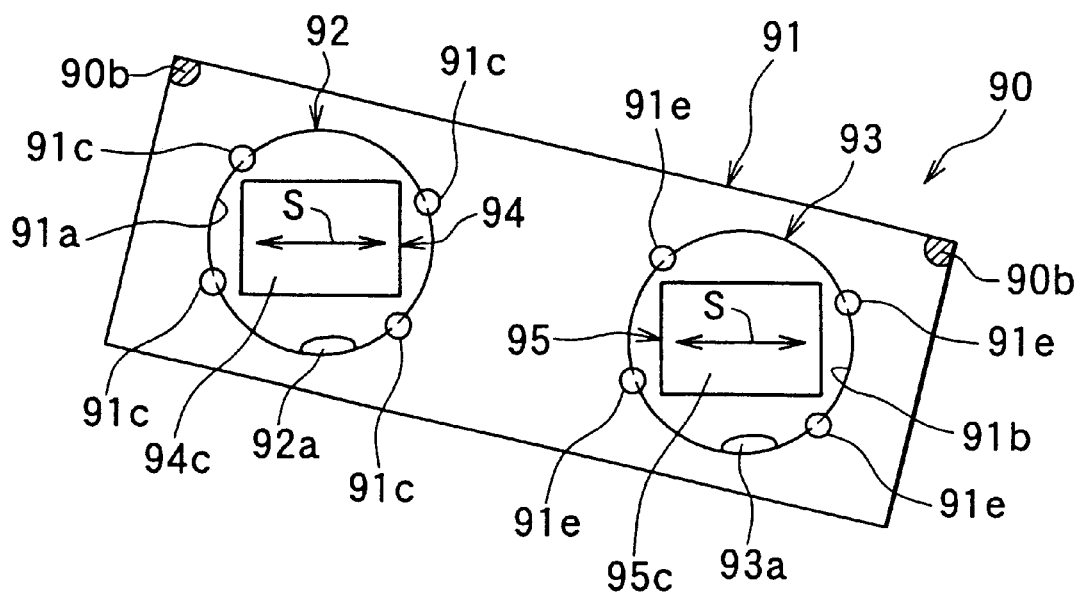
FIG. 23 is a plan view showing the liquid crystal eye shutter positioned with an angle to the horizontal line.

As shown in FIG. 22, a weight 92a is attached to the bottom part of the rotatable round plate 92. Similarly, a weight 93a is attached to the bottom part of the rotatable round plate 93. If the eye shutter 90 worn by a viewer takes a slanted position as shown in FIG. 23, both round plates 92 and 93 are rotated to the position shown in FIG. 23 due to the gravity acting on the weights 92a, 93a.

Figure 25:
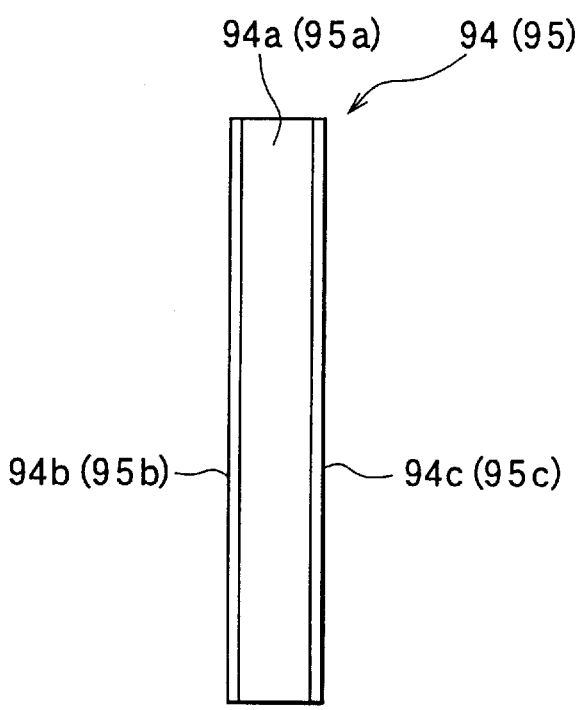
FIG. 25 is a side view showing a liquid crystal panel used in the eye shutter shown in FIG. 22.

As shown in FIG. 25, each liquid crystal shutter 94 (95) is composed of a liquid crystal panel 94a (95a), a front polarizer plate 94b (95b) from which light is incident and a rear polarizer plate 94c (95c) located at a viewer side. The liquid crystal panel 94a (95a) made of nematic liquid crystal becomes transparent when no voltage is imposed and non-transparent when voltage is imposed. The polarization axis of the front polarizer plate 94b (95b) lies in the horizontal direction (direction S in FIGS. 22 and 23) which accords with the polarization axis of the display panel 10. The polarization axis of the rear polarizer plate 94c (95c) is perpendicular to that of the front polarizer plate 94b (95b). Both liquid crystal shutters 94 and 95 are driven by the synchronous signal of the synchronous signal generating circuit 33 in the same manner as the eye shutters 41 and 42.

Since the polarization direction S of the liquid crystal shutters is always kept in the horizontal direction because of the gravity acting on the weights 92a and 93a, the image displayed on the display panel 10 can be observed by a viewer with a constant brightness, even if the eye shutter 90 is worn with a slanted angle. Some damping function may be added to the rotatable round plates 92, 93 to suppress swinging motion thereof.

Fifth Embodiment

Figure 26:
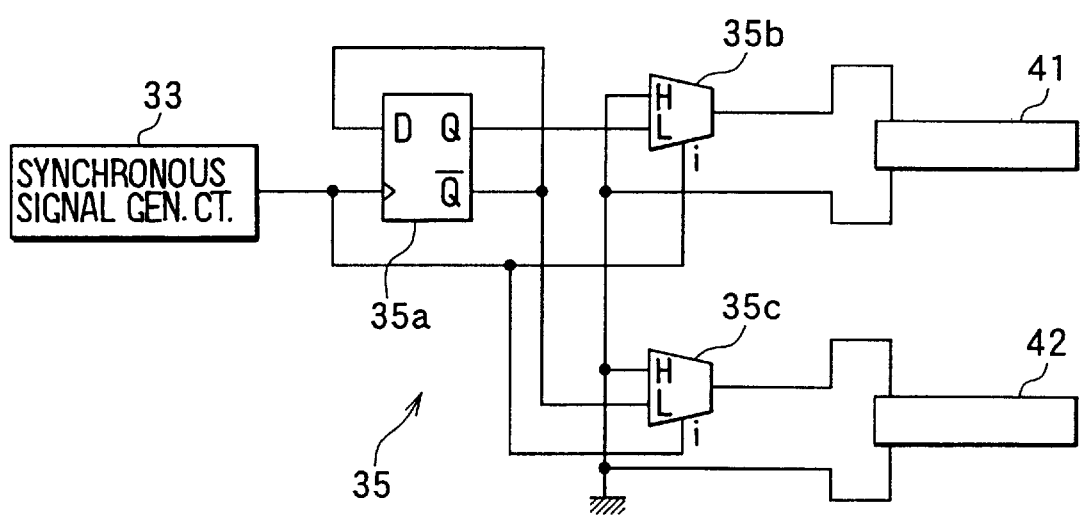
FIG. 26 is a circuit diagram showing an eye shutter driving circuit.
Figure 27:
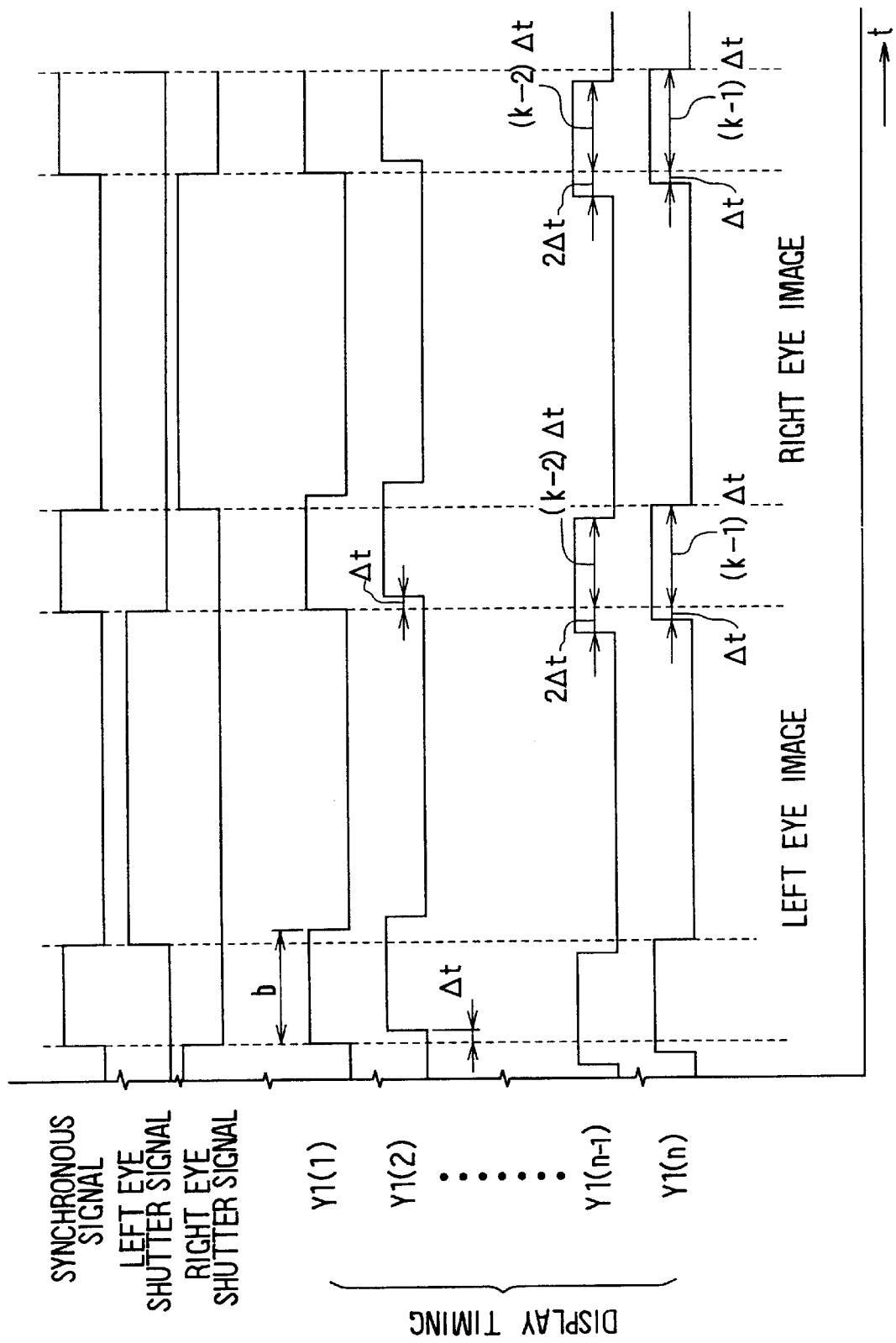
FIG. 27 is a timing chart showing operation of an eye shutter and an image display panel in a fifth embodiment.

Referring to FIGS. 26 and 27, a fifth embodiment of the present invention will be described. The eye shutter driving circuit 34 used in the first embodiment is replaced with an eye shutter driving circuit 35 in this embodiment, and the eye shutter operation timing is modified.

As shown in FIG. 26, the eye shutter driving circuit 35 includes a D-type flip-flop circuit 35a (hereinafter referred to as DFF), a pair of selectors 35b, 35c, a left eye shutter 41 and a right eye shutter 42. These components are connected as shown in FIG. 26. DFF 35a outputs a high level (H) signal at its Q terminal and a low level (L) signal at its Q-bar terminal in response to rising-up of the synchronous signal from the synchronous signal generating circuit 33. Input terminals "if" of both selectors 35b, 35c are connected to the output terminal of the synchronous signal generating circuit 33. An input terminal H of the selector 35b is grounded, and its input terminal L is connected to the output terminal Q of DFF 35a. The selector 35b generates a ground level output as a left eye shutter signal, when the "i" terminal level is equal to the H terminal level. The selector 35*b* generates an output having its L terminal level (the level of the output terminal Q of DFF 35*a*) as a left eye shutter signal, when the "i" terminal level is equal to the L terminal level. The left eye shutter signal generated by the selector 35*b* is supplied to the left eye shutter 41.

An input terminal H of the selector 35*c* is grounded, and its input terminal L is connected to the Q-bar terminal of DFF 35*a*. The selector 35*c* generates a ground level signal as a right eye shutter signal, when its "i" terminal level is equal to its H terminal level. The selector 35*c* generates an output signal having a level of its L terminal (the level of Q-bar terminal of DFF 35*a*) as a right eye shutter signal, when its "i" terminal level is equal to its L terminal level. The right eye shutter signal generated by the selector 35*c* is supplied to the right eye shutter 42.

Both the left eye shutter 41 and the right eye shutter 42 are driven by the eye shutter signals as shown in FIG. 27. Both eye shutters 41, 42 are closed during a time period "b" that is a period from a time when image display on the first scanning electrodes (Y1(1) and Y2(1)) starts to a time when image display on the last scanning electrodes (Y1(n) and Y2(n)) ends. In time periods other than "b," both eye shutters 41, 42 are alternately opened and closed. During the period "b" no display is seen by a viewer, because both eye shutters are closed. This means the cross-talk appearing at the upper and lower edges of the display panel 10 is not observed by a viewer.

Sixth Embodiment

Figure 28:
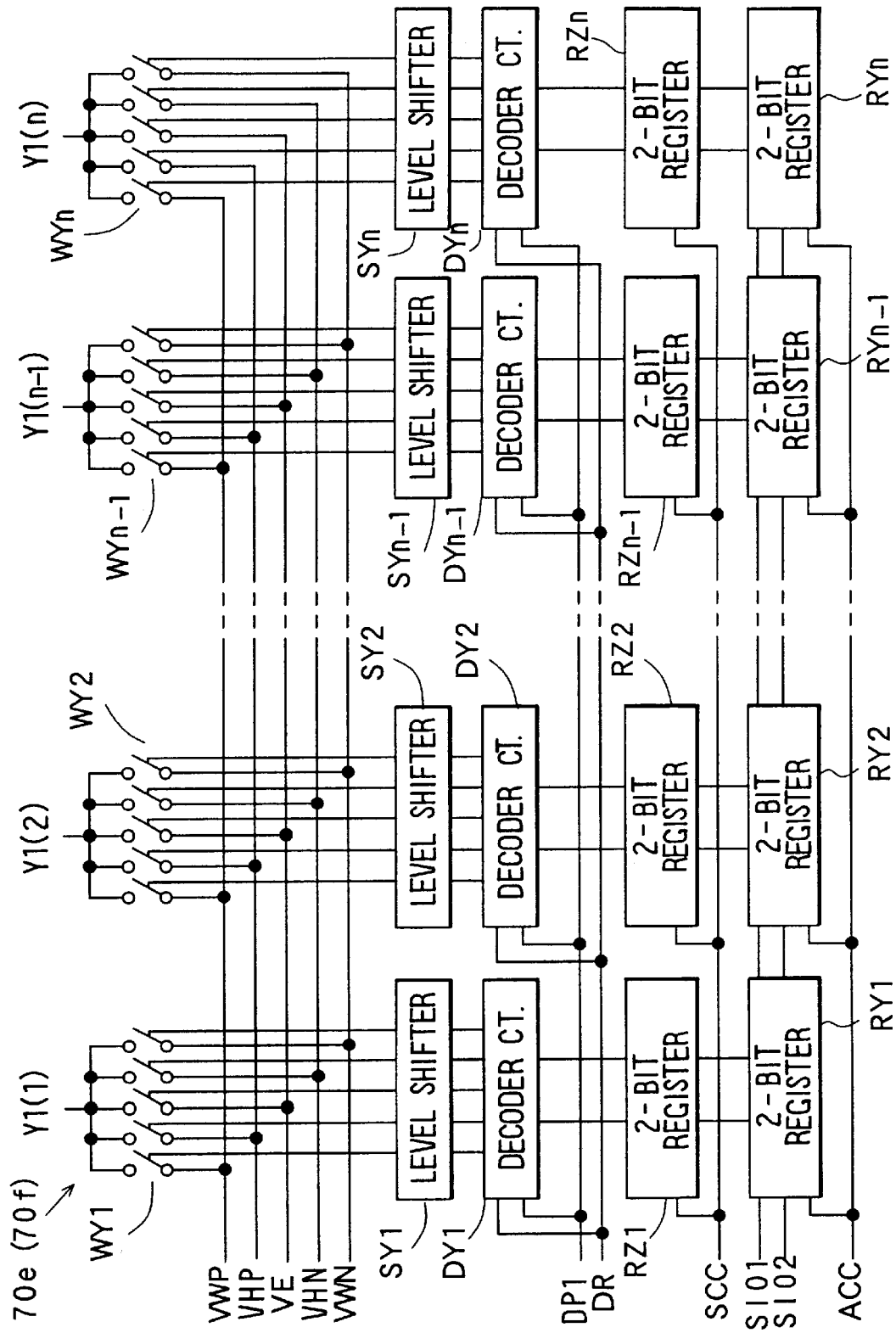
FIG. 28 is a circuit diagram showing a scanning electrode driving circuit used in a sixth embodiment.

A sixth embodiment will be described in reference to FIGS. 28 and 29. As shown in FIG. 28, the scanning electrode driving circuits 70*a*, 70*b* of the first embodiment are replaced with scanning electrode driving circuits 70*e*, 70*f*. Comparing FIG. 28 with FIG. 7 of the first embodiment, a group of 2-bit registers RZ1–RZn are additionally inserted between the 2-bit registers RY1–RYn and decoder circuits DY1–DYn, and an ACC signal is fed to the 2-bit registers RY1–RYn in place of the SCC signal. Also, the scanning control circuit 31 of the first embodiment is modified to generate two ACC signals per one SCC signal in response to falling-down of the SCC signal. Each 2-bit register RZ1–RZn supplies 2-bit data fed from the 2-bit register RY1–RYn to the corresponding decoder circuit DY1–DYn two times in response to every SCC signal input.

Figure 29:
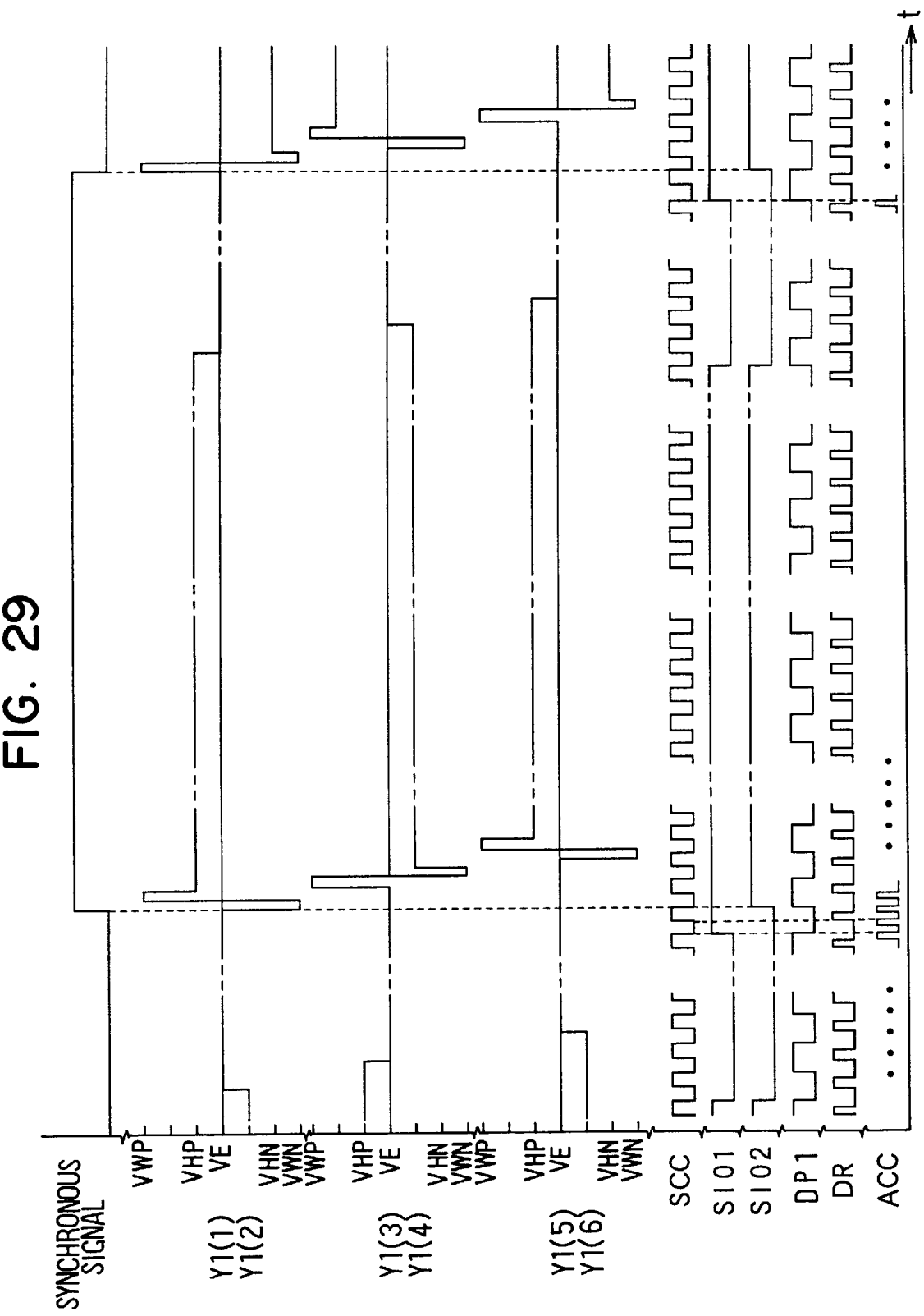
FIG. 29 is a timing chart showing operation of the scanning electrode driving circuit shown in FIG. 28.
Figure 30:
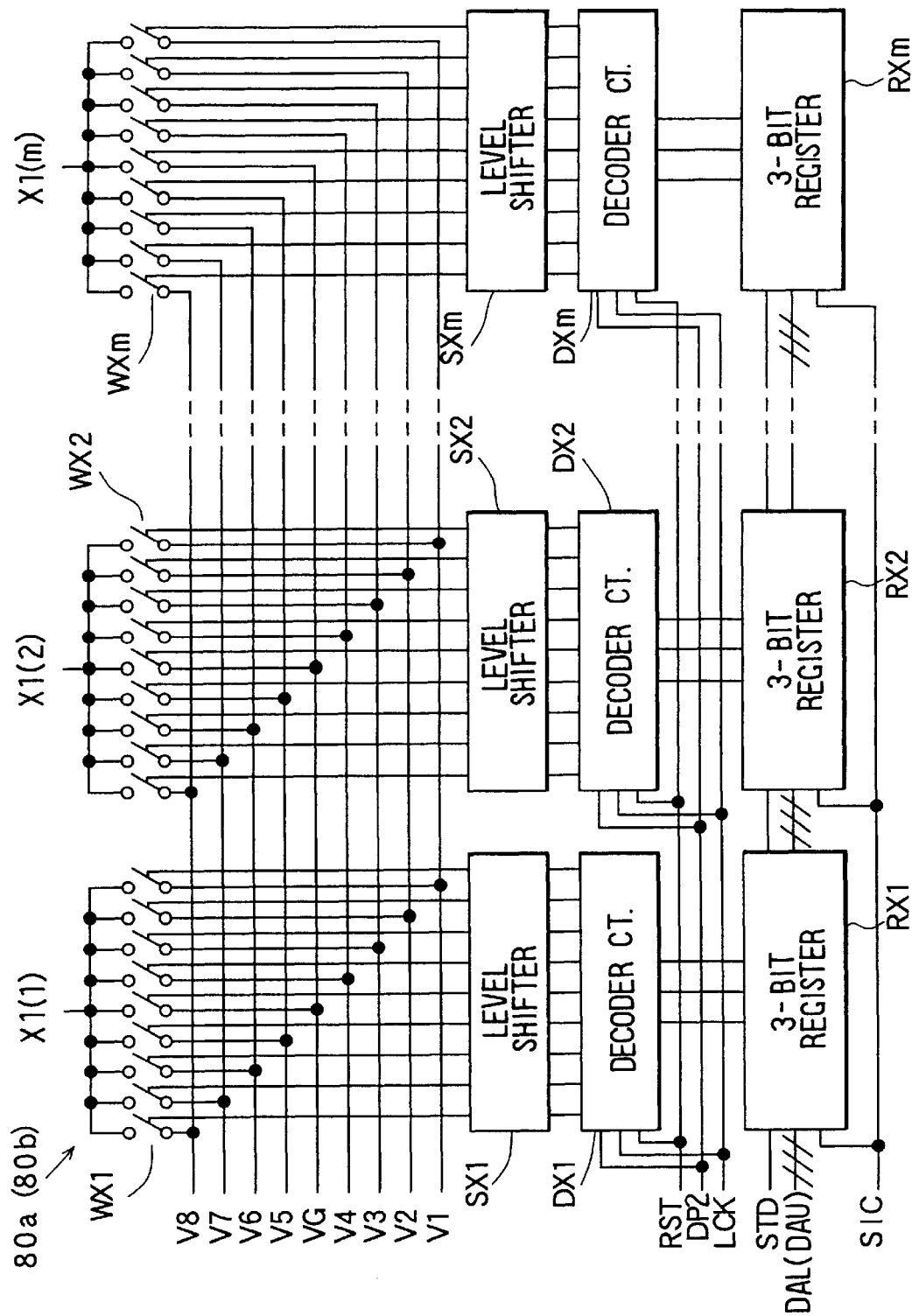
FIG. 30 is a circuit diagram showing a data electrode driving circuit used in a seventh embodiment.

As shown in FIG. 29, a pair of neighboring scanning electrodes are simultaneously scanned, thereby the image data being written on two electrodes at the same time. For example, electrodes Y1(1) and Y1(2) in the lower part 10A, and Y2(1) and Y2(2) in the upper part 10B are simultaneously scanned. Because a pair of the scanning electrodes is scanned simultaneously in this embodiment, a time period required to display one frame is one half of that of the first embodiment. In other words, the frame frequency can be doubled. Three or more scanning electrodes may be simultaneously scanned in the similar manner.

Seventh Embodiment

Figure 31:
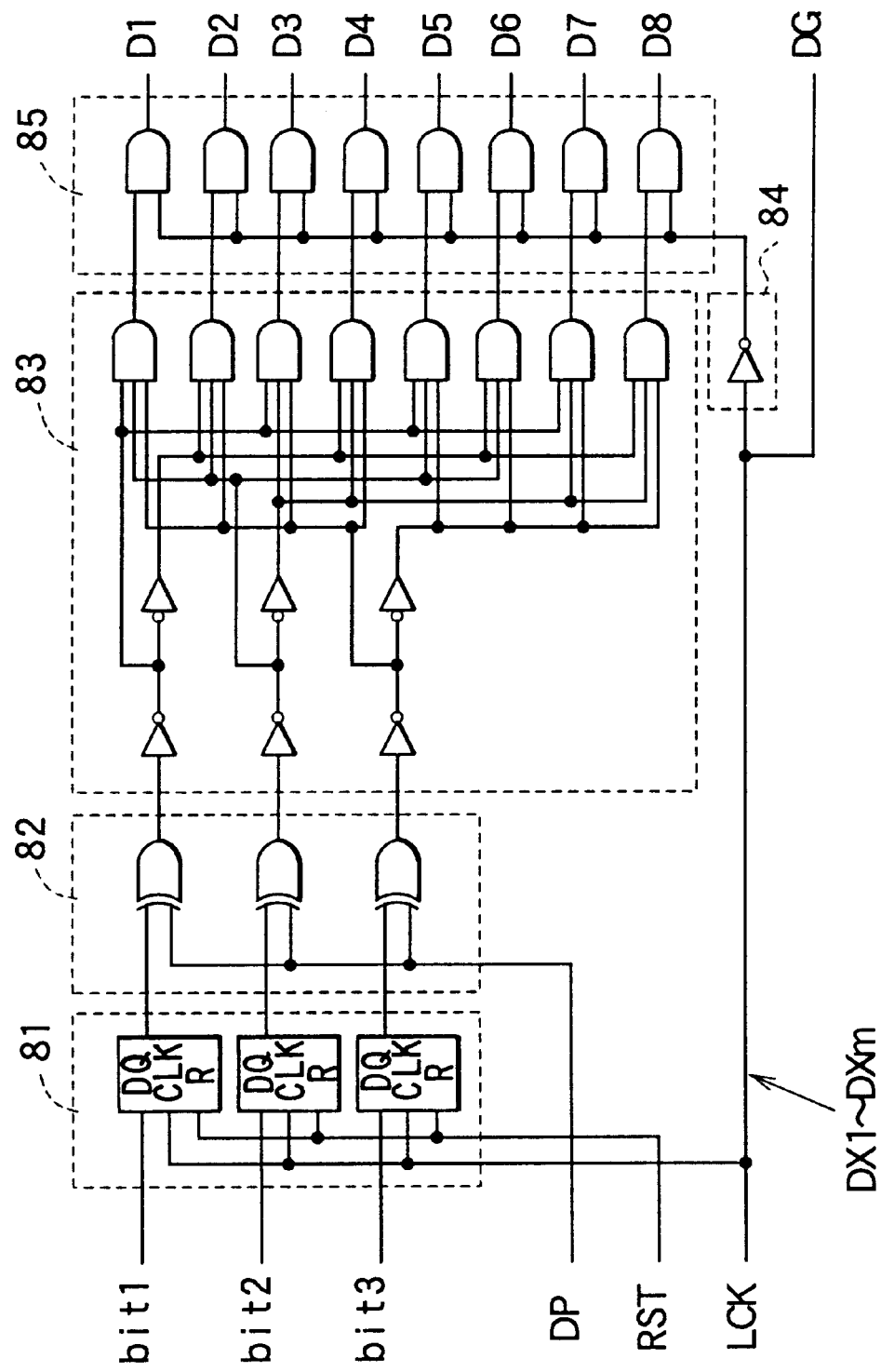
FIG. 31 is a circuit diagram showing a decoder circuit used in the data electrode driving circuit shown in FIG. 30.
Figure 32:
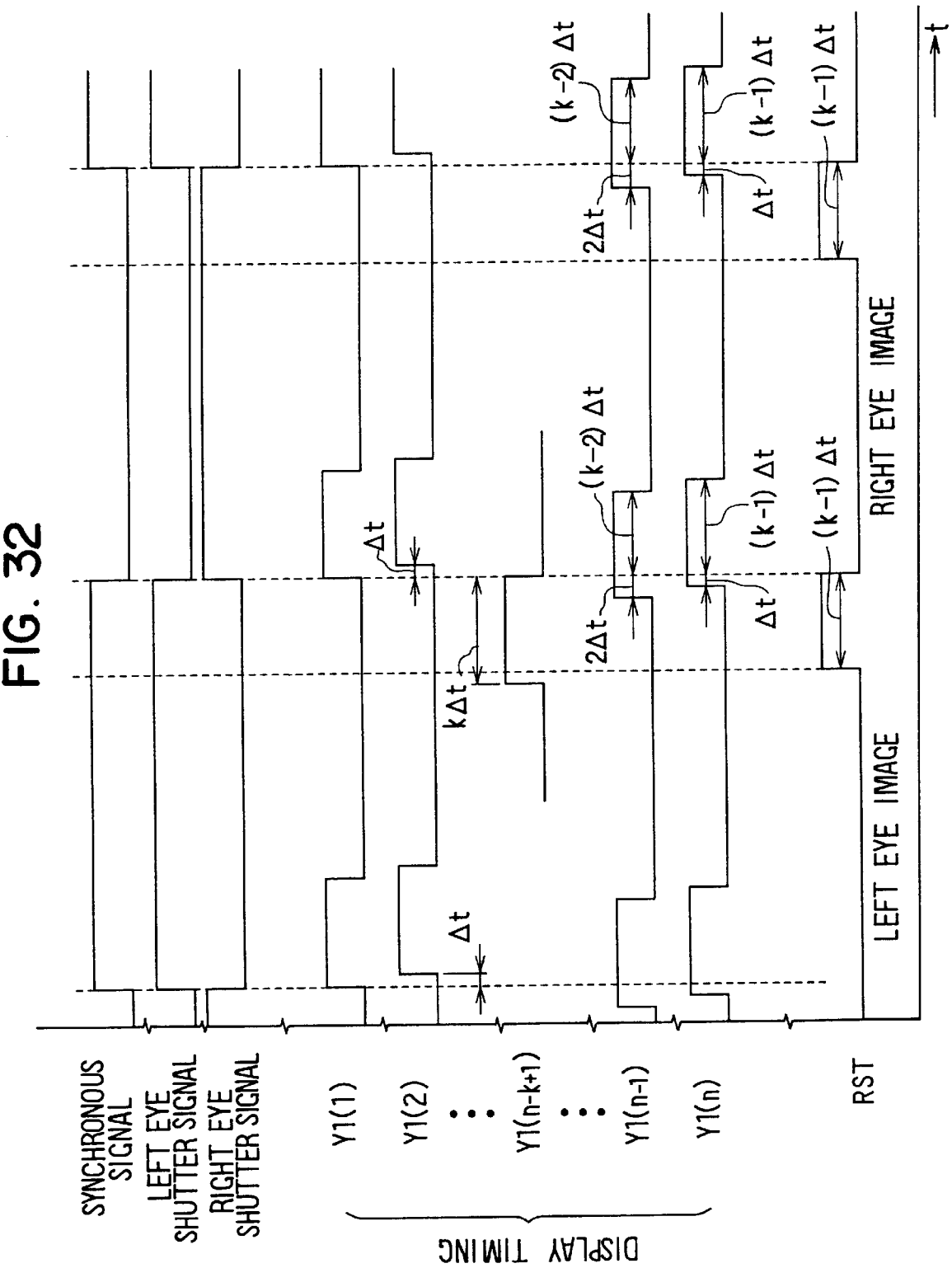
FIG. 32 is a timing chart showing operation of an eye shutter and an image display panel in the seventh embodiment.
Figure 33:
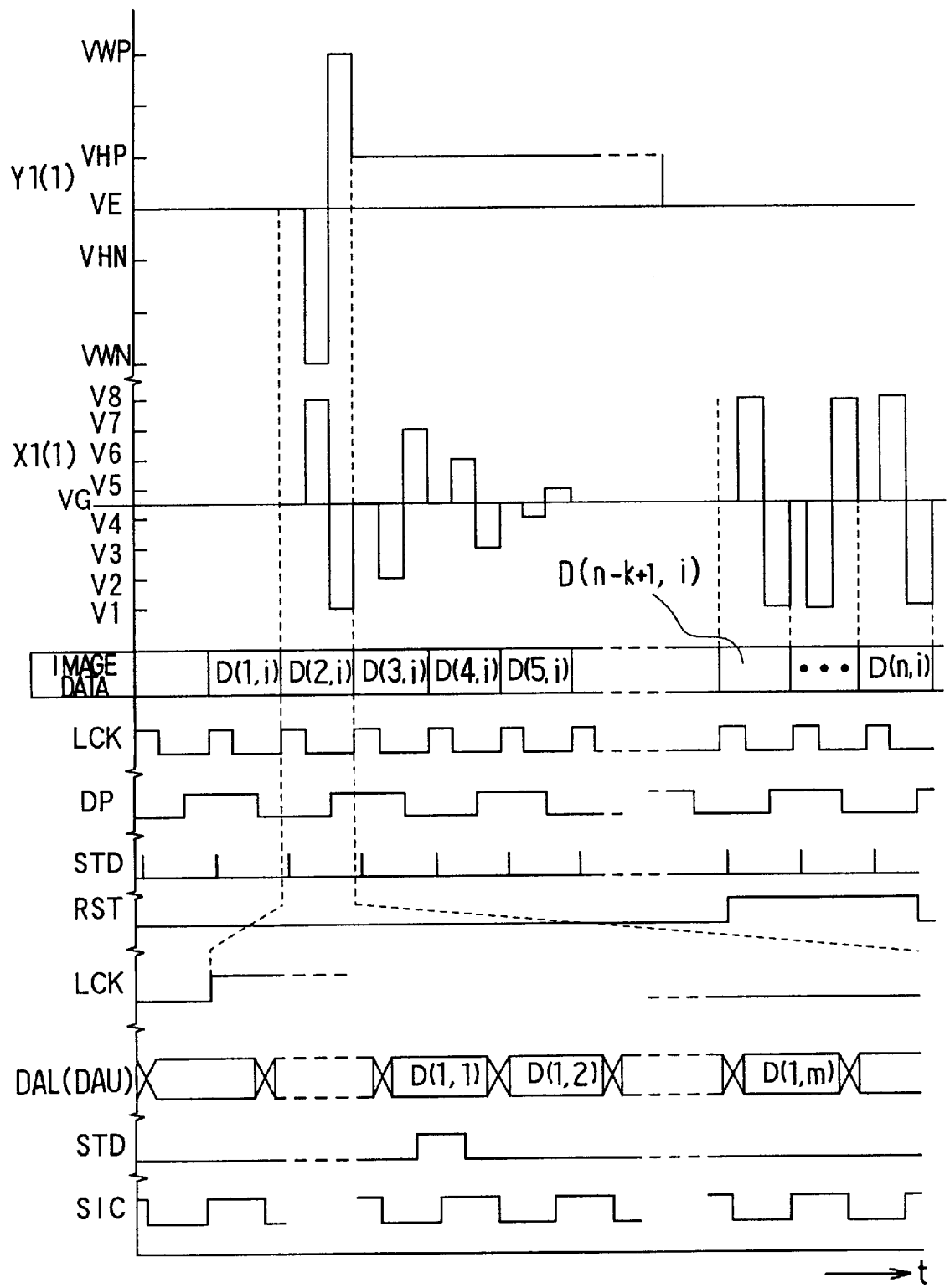
FIG. 33 is a timing chart showing operation of the scanning electrode driving circuit shown in FIG. 30.

Referring to FIGS. 30–33, a seventh embodiment will be described. In this embodiment, the data electrode driving circuits 80*a*, 80*b* (shown in FIG. 9) used in the first embodiment are modified to the ones shown in FIG. 30. Namely, an RST signal is additionally supplied to the decoder circuits DX1–DXm. The RST signal is generated by the data control circuit 32 for a period (k−1)×Δt before the synchronous signal rises up and rises down, as shown in FIG. 32. By supplying the RST signal to the decoder circuits DX1–DXm in the period of (k−1)×Δt, a white image is displayed in this period (refer to FIG. 33).

The operation of the decoder circuits DX1–DXm by the RST signal will be explained in reference to FIG. 31, taking the decoder circuit DX1 as an example. Each D-type flip-flop circuit in the logic circuit 81 generates a high level output at its output terminal Q when it is reset by the RST signal. Each D-type flip-flop circuit generates an output having a level of the input terminal D at its output terminal Q in response to rising-up of the LCK signal, when the RST signal is at a low level. Other operations are the same as those in the first embodiment.

Since a white image is shown for the period of (k−1)Δt before the eye shutter 40 is switched from one eye to the other eye, the cross-talk appearing at both upper and lower edges of the display panel 10 becomes substantially invisible. Instead of displaying the white image for a certain period before switching the eye shutter, a same image may be shown to both eyes for that certain period. The cross-talk can be made invisible in this manner, too.

Eighth Embodiment

In the foregoing embodiments, the display panel 10 is composed of the lower part 10A and the upper part 10B, and both parts are simultaneously scanned in the opposite directions, i.e., from the center toward both edges of the panel 10, or from both edges toward the center of the panel. This scanning method is called dual scanning. It is also possible to scan a whole panel in one direction without dividing the panel into two parts. This is called single scanning. The eighth embodiment described below is a stereoscopic display device, the display panel of which is scanned in the single scanning method.

Figure 34:
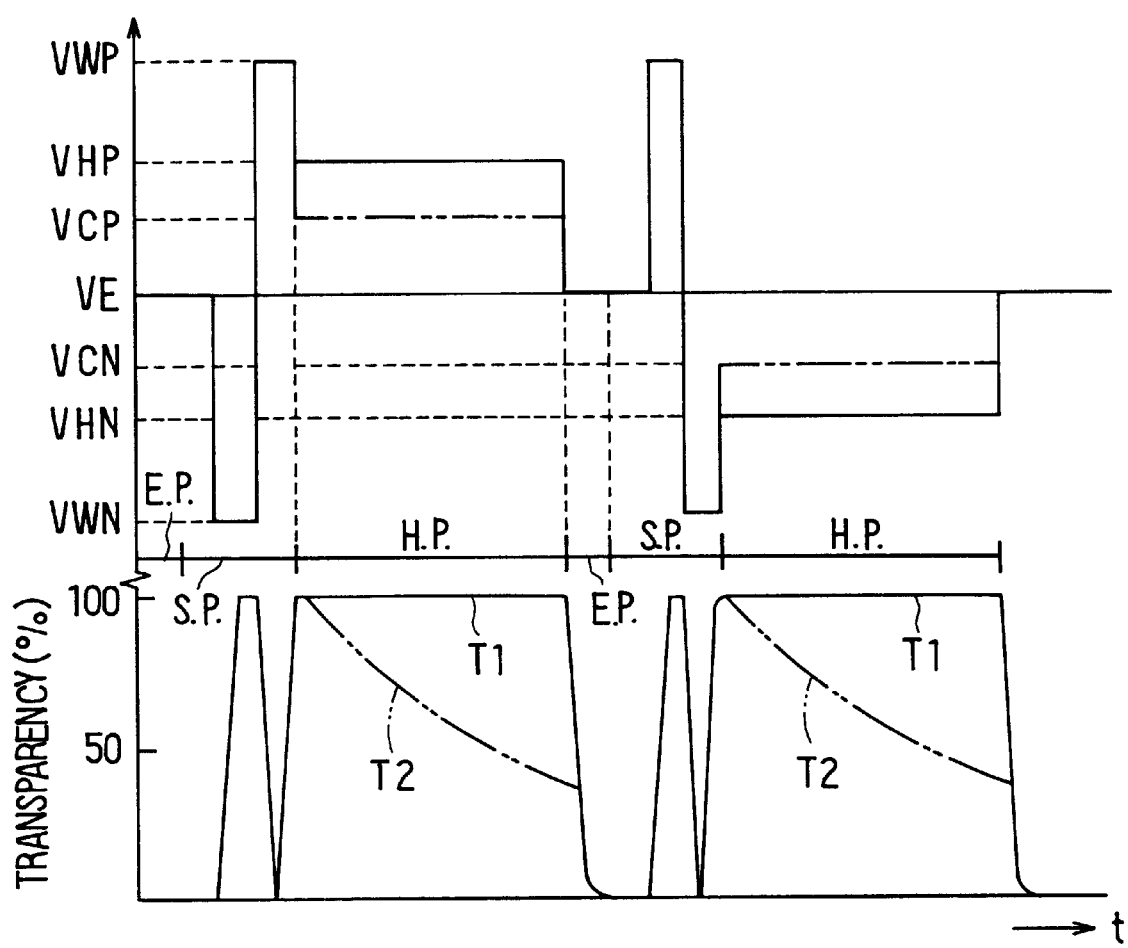
FIG. 34 is a timing chart showing waveforms of voltage imposed on antiferroelectric liquid crystal and transparency of the liquid crystal in an eighth embodiment.

Referring to FIG. 34, the eighth embodiment of the present invention will be described. In this embodiment, the scanning voltage supplied to the scanning electrodes in the holding period is made lower than that supplied in the foregoing embodiments. That is, a voltage VCP is supplied in the positive holding period in place of the voltage VHP, and a voltage VCN is supplied in the negative holding period in place of the voltage VHN.

First, referring to FIG. 15 again, the relation between voltages imposed on the antiferroelectric liquid crystal and the transparency thereof will be explained. The liquid crystal transparency shows a double hysteresis curve as shown by arrows in the curve of FIG. 15 according to voltage imposed thereon. As the voltage is gradually increased, the transparency reaches its maximum level at voltage VWP. When the voltage is decreased, the maximum transparency level is kept until the voltage reaches a positive threshold voltage VthP. The stransparency starts to drop at VthP and becomes about half of the maximum level at voltage VCP. As the voltage is swept to the negative voltage, the transparency gradually increases and reaches the maximum level at a negative voltage VWN. As the voltage is changed in the reverse direction, the transparency maximum level is kept until the voltage reaches a negative threshold level VthN. The transparency starts to drop at VthN and becomes about a half of the maximum level at voltage VCN.

Figure 16:
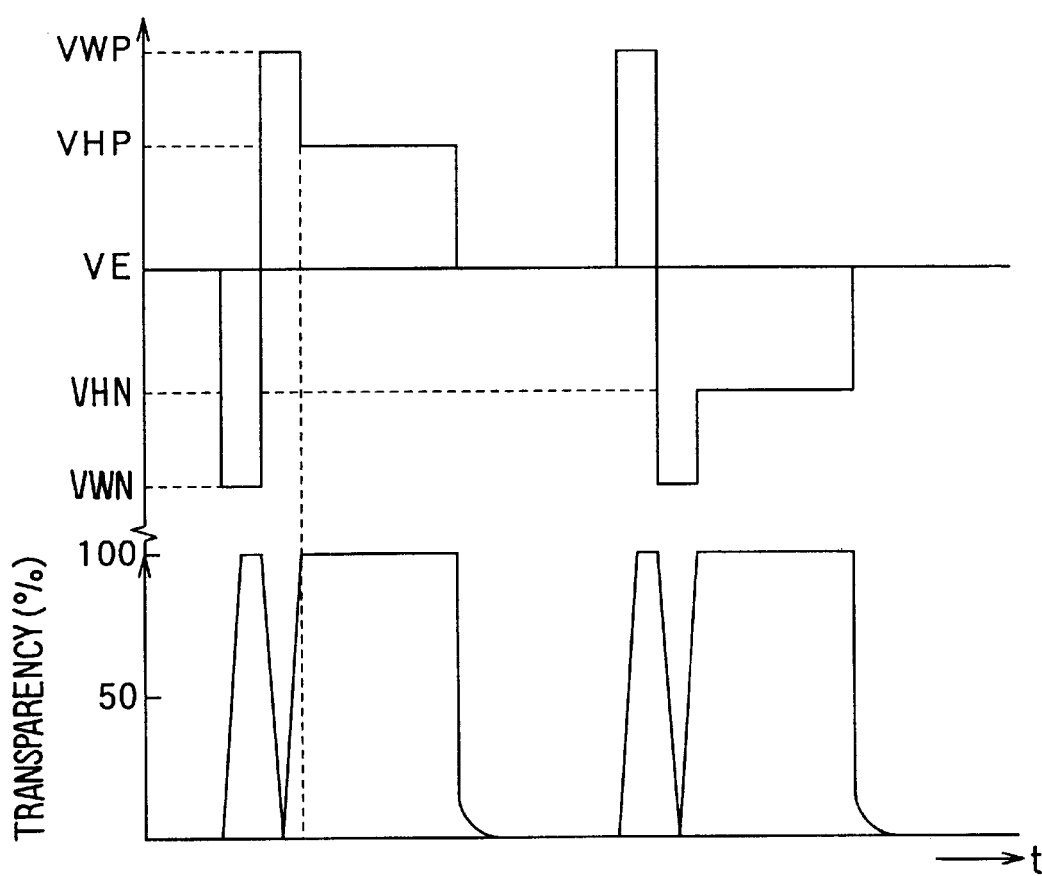
FIG. 16 is a graph showing waveforms of voltage imposed on the antiferroelectric liquid crystal and transparency thereof.

In the first embodiment, as shown in FIG. 16, the voltage VHP that keeps the displayed image at a brightest level is supplied to the scanning electrodes in the holding period (HP). In the eighth embodiment, as shown in FIG. 34, the voltage VCP that makes the displayed image brightness about a half of the highest level is supplied to the scanning electrodes in the holding period. The transparency of the antiferroelectic liquid crystal is kept at the level shown with T1 (FIG. 34) if the voltage VHP is supplied. When the voltage VCP is supplied as in the eighth embodiment, the transparency decreases along the line T2 in the holding period. The transparency shows the same curve both in the positive and negative holding period. This means that the image brightness on a given scanning electrode gradually decreases in the holding period. Therefore, the cross-talk image becomes darker to such a degree that it is hardly recognized by a viewer, though the brightness of the displayed image is sacrificed as a whole.

Ninth Embodiment

Figure 35:
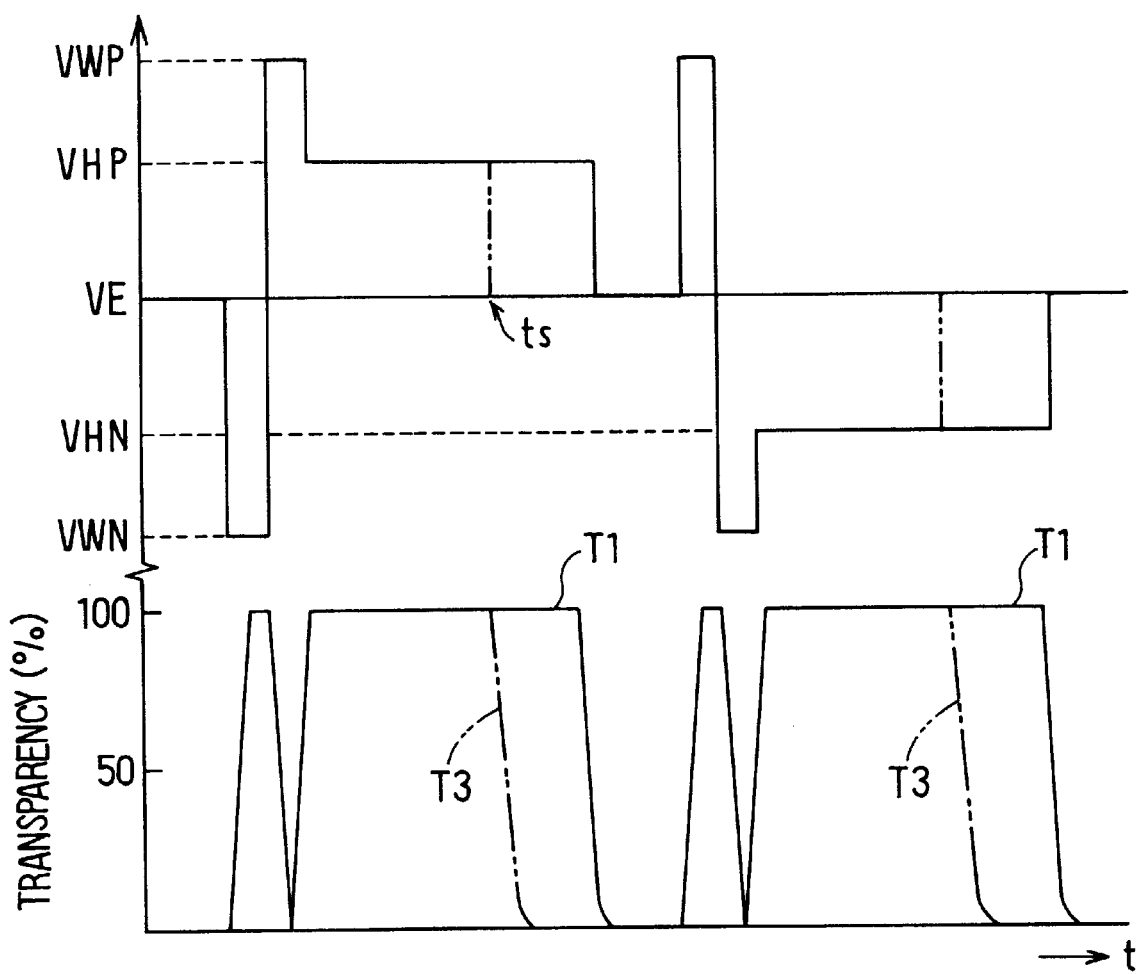
FIG. 35 is a timing chart showing waveforms of voltage imposed on antiferroelectric liquid crystal and transparency of the liquid crystal in a ninth embodiment.

A ninth embodiment of the present invention will be described in reference to FIG. 35. This embodiment employs another method to alleviate the cross-talk in the display. In this embodiment, a full holding voltages VHP and VHN are supplied to the scanning electrodes in the holding period, as opposed to the eight embodiment. But, the holding period is shortened to eliminate the displayed image earlier. That is, the holding period is terminated earlier at "ts" as shown in FIG. 35. The transparency of the antiferroelectric liquid crystal changes as shown with curve T3. This means that the image previously displayed on a given scanning electrode is eliminated earlier. Therefore, the cross-talk image is also suppressed.

For example, the holding period can be set so that the image written on the first canning electrode is eliminated when scanning reaches the middle part of the display panel. Assuming that there are 220 scanning electrodes on the panel and they are sequentially scanned from the upper edge toward the bottom edge of the panel, when the scanning proceeds to the $110^{th}$ electrode from the first electrode and the $111^{th}$ scanning electrode is about to be scanned, an image for one eye already written on the first line disappears. Similarly, as the scanning further proceeds, image written on the following scanning electrodes is sequentially eliminated. When the scanning reaches the last $220^{th}$ electrode, the image shown in the upper half of the panel is eliminated. When the image for the other eye is written on the first line, the image for the one eye written on the $111^{th}$ electrode is eliminated. The scanning further proceeds in the same manner. Thus, the cross-talk image can be made invisible.

Tenth Embodiment

Figure 36:
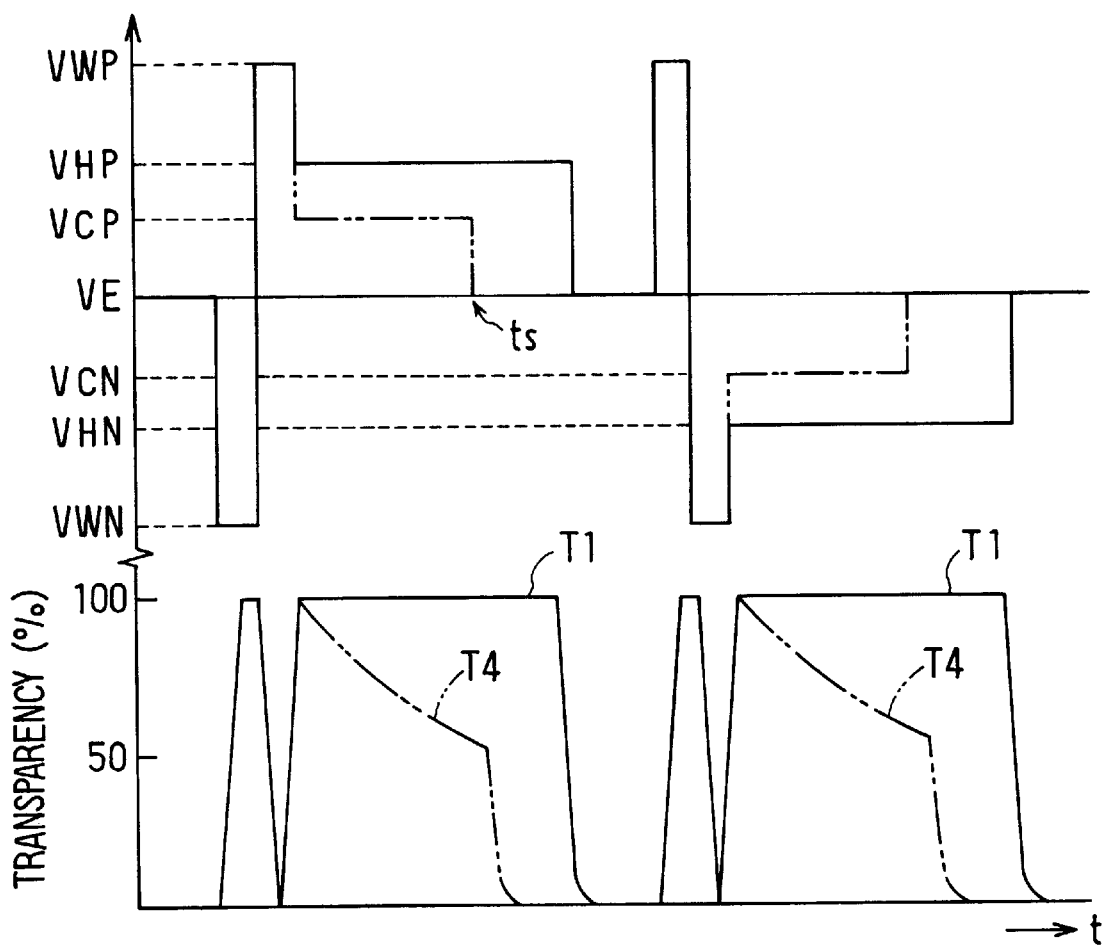
FIG. 36 is a timing chart showing waveforms of voltage imposed on antiferroelectric liquid crystal and transparency of the liquid crystal in a tenth embodiment.
Figure 37:
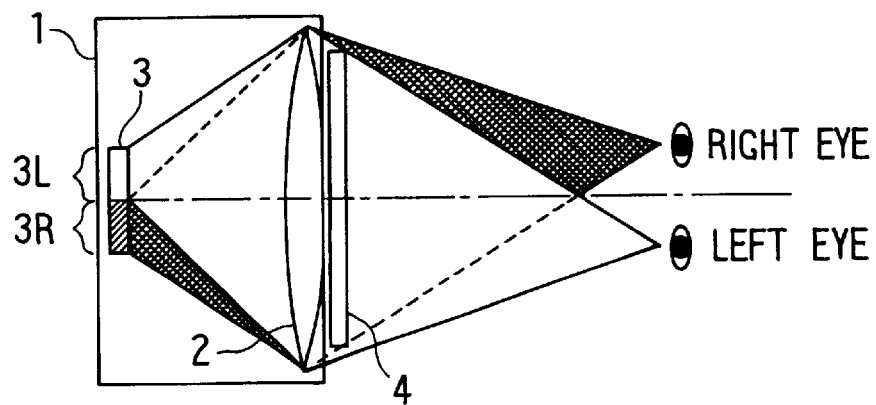
FIG. 37 is a schematic diagram showing a conventional stereoscopic image display device.

A tenth embodiment of the present invention will be described in reference to FIG. 36. This embodiment is a combination of the eighth and ninth embodiments. Namely, the voltage VCP (VCN) that is smaller than VHP (VHN) is supplied to the scanning electrodes in the holding period as in the eighth embodiment, and the holding period is earlier terminated at "ts" as in the ninth embodiment. The transparency of the antiferroelectric liquid crystal decreases along line T4 in the holding period.

In this manner, the cross-talk image is further suppressed, compared with the eighth and ninth embodiments, though the displayed image brightness as a whole becomes darker.

Though the single scanning method is used in the eighth to tenth embodiments, the dual scanning method can be similarly used. Though the antiferroelectric liquid crystal is used in the display panel of all of the foregoing embodiments, other liquid crystal such as ferroelectric or smectic liquid crystal can be used. Also, the present invention may be applicable to a stereoscopic display device in which an electroluminescent display panel is used.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A stereoscopic image display device comprising:
   a display panel having a plurality of scanning electrodes, a plurality of data electrodes extending perpendicularly to the scanning electrodes, and liquid crystal filling a space between the scanning electrodes and data electrodes, pixels being formed at each intersection of the scanning and data electrodes together with the liquid crystal, the display panel being divided into an upper half part and a lower half part;
   a scanning control circuit for scanning the scanning electrodes by sequentially supplying scanning voltages to each scanning electrode and by maintaining the same for a predetermined period, the scanning electrodes located in the upper half part of the panel and the scanning electrodes located in the lower half part being scanned separately but simultaneously in opposite directions;
   an image data control circuit for sequentially supplying image data voltages to the data electrodes in synchronism with scanning of the scanning electrodes, so that a left eye image is displayed on the display panel in a first field during which all the scanning electrodes are once scanned and a right eye image is displayed in a second field during which all the scanning electrodes are once scanned; and
   an eye shutter having a left eye shutter and a right eye shutter to be worn by a viewer, both the left and right eye shutters being alternately opened and closed in synchronism with display of the respective left and right eye images on the display panel, wherein:
   the scanning electrodes are scanned in such a manner that the image data is written on the pixels in a selecting period, the written image data is held on the pixels in a holding period and the image data is eliminated in an eliminating period; and
   the one eye shutter is opened and the other eye shutter is closed until a time immediately before the image for the other respective eye image is displayed on the scanning electrode first scanned.

2. The stereoscopic image display device as in claim 1, wherein:
   the upper part of the display panel is scanned from the center of the display panel toward an upper edge thereof, and the lower part of the display panel is scanned from the center of the display panel toward a lower edge thereof.

3. The stereoscopic image display device as in claim 1, wherein:
   the upper part of the display panel is scanned from an upper edge of the display panel toward the center thereof, and the lower part of the display panel is scanned from a lower edge of the display panel toward the center thereof.

4. The stereoscopic image display device as in claim 1, wherein:
   each scanning electrode is sequentially scanned with a shift time $\Delta t$ for displaying an image on the display panel; and
   the second field scanning starts a period $L\Delta t$ after the scanning of the last scanning electrode in the first field started, where L is larger than one.

5. The stereoscopic image display device as in claim 1, wherein:
   a same image for both eye images is displayed for a predetermined period before the eye shutter is switched from one eye image to the other eye image.

6. The stereoscopic image display device as in claim 1, wherein:
   each scanning electrode is sequentially scanned with a shift time $\Delta t$ for displaying an image on the display panel; and
   both the left and right eye shutters are closed until the image displayed on the scanning electrode last scanned in a previous field is eliminated.

7. The stereoscopic image display device as in claim 1, wherein:
   the eye shutter comprises a non-transparent plate and a pair of round plates rotatably mounted on the nontransparent plate, each round plate carrying a liquid crystal eye shutter having a polarization axis on a surface that faces the displayed image, whereby the round plate is rotated so that the polarization axis of the eye shutter becomes parallel to a polarization axis of the image display panel.

8. The stereoscopic image display device as in claim 7, wherein:
   a weight is provided on each of the round plate, so that the round plate is automatically rotated by gravity acting on the weight and the polarization axis of the eye shutter becomes parallel to the polarization axis of the display panel irrespective of an angle of the nontransparent plate relative to the horizontal line.

9. The stereoscopic image display device as in claim 1, wherein:
   the scanning electrodes are sequentially scanned group by group, each group consisting of a plurality of neighboring scanning electrodes.

10. The stereoscopic image display device as in claim 1, further comprising an outer circuit for supplying image data to the display device, the outer circuit supplying image data for displaying a same image both for the left and right eyes on the scanning electrodes to be last scanned in each field.

11. The stereoscopic image display device as in claim 1, wherein:
    the liquid crystal filling the space between the scanning and data electrodes is antiferroelectric liquid crystal.

12. A stereoscopic image display device comprising:
    a display panel having a plurality of scanning electrodes, a plurality of data electrodes extending perpendicularly to the scanning electrodes, and liquid crystal filling a space between the scanning and data electrodes, pixels being formed at each intersection of the scanning and data electrodes together with the liquid crystal;
    a scanning control circuit for scanning the scanning electrodes by sequentially supplying scanning voltages to each scanning electrode;
    an image data control circuit for sequentially supplying image data voltages to the data electrodes in synchronism with scanning of the scanning electrodes, so that a left eye image is displayed on the display panel in a first field during which all the scanning electrodes are once scanned and a right eye image is displayed in a second field during which all the scanning electrodes are once scanned; and
    an eye shutter having a left eye shutter and a right eye shutter to be worn by a viewer, both the left and right eye shutters being opened and closed in synchronism with display of the respective left and right eye images on the display panel, wherein:
    the scanning electrodes are scanned in such a manner that the image data is written on the pixels in a selecting period, the written image data is held on the pixels in the holding period and the image data is eliminated in an eliminating period.

13. The stereoscopic image display device as in claim 12, wherein:
    a holding voltage is supplied to the scanning electrodes in the holding period, the holding voltage being set to a level that is lower than a level at which brightness of the image written on the pixels is maintained.

14. The stereoscopic image display device as in claim 12, wherein:
    the image held on the pixels in the holding period is eliminated at such a time that cross-talk appearing on the display panel becomes substantially invisible.

15. The stereoscopic image display device as in claim 12, wherein:
    a holding voltage is supplied to the scanning electrodes in the holding period, the holding voltage being set to a level that is lower than a level at which brightness of the image written on the pixels is maintained; and
    the image held on the pixels in the holding period is earlier eliminated at such a time that cross-talk appearing on the display panel becomes substantially invisible.

16. The stereoscopic image display device as in claim 12, wherein:
    a holding voltage is supplied to the scanning electrodes in the holding period, the holding voltage being set to a level that is lower than a level at which brightness of the image written on the pixels becomes one half of a full brightness.

17. The stereoscopic image display device as in claim 12, wherein:
    an image written on the pixels corresponding to a scanning electrode that is first scanned in a given field is eliminated when the display panel is scanned up to a middle of the display panel.

18. The stereoscopic image display device as in claim 12, wherein:
    the image written on the pixels is held in the holding period with a brightness level that is lower than a brightness level with which the image is written in the selecting period.

19. The stereoscopic image display device as in claim 12, wherein:
    the liquid crystal filling the space between the scanning and data electrodes is antiferroelectric liquid crystal.

20. A stereoscopic image display device comprising:
    a display panel having a plurality of scanning electrodes, a plurality of data electrodes extending perpendicularly to the scanning electrodes, and liquid crystal filling a space between the scanning electrodes and data electrodes, pixels being formed at each intersection of the scanning and data electrodes together with the liquid crystal, the display panel being divided into an upper half part and a lower half part;
    a scanning control circuit for scanning the scanning electrodes by sequentially supplying scanning voltages to each scanning electrode and by maintaining the same for a predetermined period, the scanning electrodes located in the upper half part of the panel and the scanning electrodes located in the lower half part being scanned separately but simultaneously in opposite directions;

an image data control circuit for sequentially supplying image data voltages to the data electrodes in synchronism with scanning of the scanning electrodes, so that a left eye image is displayed on the display panel in a first field during which all the scanning electrodes are once scanned and a right eye image is displayed in a second field during which all the scanning electrodes are once scanned; and an eye shutter having a left eye shutter and a right eye shutter to be worn by a viewer, both the left and right eye shutters being opened and closed in synchronism with display of the respective left and right eye images on the display panel, either one of the left eye shutter or the right eye shutter being opened and the other eye shutter closed until a time immediately before the image for the other eye is displayed.

21. The stereoscopic image display device as in claim 20, wherein the liquid crystal includes at least one type of antiferroelectric liquid with a double hysteresis voltage-transparency characteristic.

22. The stereoscopic image display device as in claim 20, wherein:

a time period in which the left eye image and right eye image is displayed on each of the plurality of scanning electrodes is set to k*Δt, wherein a value of k is selected that eliminates cross-talk.

* * * * *